US011379498B2

(12) United States Patent
Gandhi et al.

(10) Patent No.: US 11,379,498 B2
(45) Date of Patent: Jul. 5, 2022

(54) LIVE DATA CONVERSION AND MIGRATION FOR DISTRIBUTED DATA OBJECT SYSTEMS

(71) Applicant: Dropbox, Inc., San Francisco, CA (US)

(72) Inventors: Ashish Gandhi, San Francisco, CA (US); Renjish Abraham, Lafayette, CA (US); Kevin Farrell, San Francisco, CA (US)

(73) Assignee: DROPBOX, INC., San Francisco, CA (US)

(*) Notice: Subject to any disclaimer, the term of this patent is extended or adjusted under 35 U.S.C. 154(b) by 73 days.

(21) Appl. No.: 16/878,134

(22) Filed: May 19, 2020

(65) Prior Publication Data
US 2021/0279248 A1 Sep. 9, 2021

Related U.S. Application Data

(60) Provisional application No. 62/986,598, filed on Mar. 6, 2020, provisional application No. 62/987,308, filed on Mar. 9, 2020.

(51) Int. Cl.
| | |
|---|---|
| *G06F 16/25* | (2019.01) |
| *G06F 16/27* | (2019.01) |
| *G06F 16/21* | (2019.01) |
| *G06F 16/22* | (2019.01) |
| *G06F 16/28* | (2019.01) |
| *G06F 21/62* | (2013.01) |
| *G06F 21/64* | (2013.01) |
| *H04L 9/40* | (2022.01) |

(Continued)

(52) U.S. Cl.
CPC ........ *G06F 16/258* (2019.01); *G06F 11/1004* (2013.01); *G06F 11/3034* (2013.01); *G06F 16/214* (2019.01); *G06F 16/2282* (2019.01); *G06F 16/27* (2019.01); *G06F 16/284* (2019.01); *G06F 21/6218* (2013.01); *G06F 21/64* (2013.01); *H04L 63/1458* (2013.01)

(58) Field of Classification Search
None
See application file for complete search history.

(56) References Cited

U.S. PATENT DOCUMENTS

| | | | |
|---|---|---|---|
| 6,304,882 B1 * | 10/2001 | Strellis | G06F 11/2064 714/E11.107 |
| 6,532,480 B1 | 3/2003 | Boothby | |

(Continued)

OTHER PUBLICATIONS

Carstoiu B., et al., "High Performance Eventually Consistent Distributed Database Zatara," INC2010: 6th International Conference on Networked Computing, May 2010, retrieved from: https://ieeexplore.ieee.org/document/5484863, 6 pages.

(Continued)

*Primary Examiner* — Robert W Beausoliel, Jr.
*Assistant Examiner* — Cheryl M Shechtman
(74) *Attorney, Agent, or Firm* — Fenwick & West LLP

(57) ABSTRACT

The data of data objects stored in a DDOS are converted from one data format to another. The conversion is performed while the system is live and available to process requests for access to the data objects being converted. The conversion techniques do not require taking the DDOS offline. The conversion techniques also do not require locking a data object for the entire conversion of the data object.

16 Claims, 7 Drawing Sheets

(51) Int. Cl.
  *G06F 11/10* (2006.01)
  *G06F 11/30* (2006.01)

(56) References Cited

U.S. PATENT DOCUMENTS

| | | | |
|---|---|---|---|
| 7,080,221 B1* | 7/2006 | Todd | G06F 3/0605 |
| | | | 707/999.201 |
| 7,321,904 B2 | 1/2008 | Holenstein et al. | |
| 7,788,225 B2 | 8/2010 | Fish et al. | |
| 8,719,223 B2 | 5/2014 | Knapp et al. | |
| 9,607,004 B2* | 3/2017 | Haustein | G06F 16/119 |
| 10,078,556 B2 | 9/2018 | Clare et al. | |
| 10,083,199 B1 | 9/2018 | Sharma | G06F 16/2343 |
| 10,242,010 B2* | 3/2019 | Heard | G06F 16/137 |
| 10,509,675 B2 | 12/2019 | Karmarkar et al. | |
| 10,740,286 B1* | 8/2020 | Gilderman | G06F 9/5038 |
| 10,924,587 B1* | 2/2021 | Chaudhuri | G06F 16/214 |
| 2002/0040369 A1 | 4/2002 | Multer et al. | |
| 2016/0147569 A1* | 5/2016 | Cowling | G06F 16/22 |
| | | | 718/104 |
| 2016/0253339 A1 | 9/2016 | Ambrose et al. | |
| 2017/0221153 A1* | 8/2017 | Allbright | G06Q 40/12 |
| 2019/0114289 A1 | 4/2019 | Dang et al. | |
| 2019/0205429 A1* | 7/2019 | Lee | G06F 16/176 |
| 2019/0311057 A1 | 10/2019 | Sung et al. | |

OTHER PUBLICATIONS

Google Cloud Blog, "New File Checksum Feature Lets You Validate Data Transfers Between HDFS and Cloud Storage", https://cloud.google.com/blog/products, dated Mar. 3, 2020, 8 pages.

He et al., "RCFile: A Fast and Space-efficient Data Placement Structure in MapReduce-based Warehouse Systems", IEEE, dated 2011, 10 pages.

Kadatch et al., "Everything We Know About CRC but Afraid to Forget", dated Sep. 3, 2010, 29 pages.

Apache ORC, "ORC Specification V1", dated Mar. 23, 2020, htps /orc.apache.org/spec f cat on/ORCv1, 36 pages.

* cited by examiner

LIVE DATA CONVERSION AND MIGRATION FOR DISTRIBUTED DATA OBJECT SYSTEMS

BENEFIT CLAIM

This application claims the benefit of the following two United States Provisional Patent Applications: (1) Ser. No. 62/986,598, filed Mar. 6, 2020; and (2) Ser. No. 62/987,308, filed Mar. 9, 2020. The entire contents of each of these two applications is hereby incorporated by reference as if fully set forth herein.

TECHNICAL FIELD

This disclosure relates generally to converting the data of data objects stored in a distributed data object system while the system is "live" and available to process requests for access to the data objects being converted. The disclosure also relates generally to migrating data objects stored by a "source" distributed data object system from the source system to a "target" distributed data object system while at least the source system is live and available to process requests for access to the data objects being migrated.

BACKGROUND

Large-scale distributed data object systems exist for storing and providing access to massive amounts of data (e.g., terabytes or petabytes of data or more). Broadly speaking, a distributed data object system (or "DDOS" for short) encompasses a set of computing devices that provides access to a large number of data objects stored at the devices. The number of data objects may number into the thousands, millions, billions, or trillions, for example.

A DDOS system is sometimes referred to as a network object system. With some DDOS systems, the data objects stored include files organized according to a file system. Where the data objects include files organized in a file system, a DDOS is sometimes referred to as a distributed file system (or "DFS" for short) or a network file system (or "NFS" for short). Various different DDOSs exist. Some examples of a DDOS include the Apache Hadoop® Distributed File System (HDFS) and the Amazon Simple Storage Service® (Amazon S3®).

A DDOS can be locally managed or remotely accessed. A locally managed DDOS is sometimes referred to as an "on-premises" DDOS. A remotely accessed DDOS is sometimes referred to as a "cloud" DDOS. The Apache Hadoop® Distributed File System (HDFS) is an example of a DDOS that can be used as an on-premises DDOS. Amazon S3® is an example of a cloud DDOS.

Whether on-premises or in the cloud, the DDOS supports an application programming interface (API) protocol for creating, reading, updating, and deleting data objects in the DDOS. The data object access API is typically invoked at a client computing device of the DDOS which results in data access commands and data being sent over a data communications network connecting the client computing device and the DDOS. However, it also possible for the data object access API to be invoked at the same computing device of the DDOS where data objects are stored.

Various different data object access APIs exist. Some data object access APIs are implemented based on one or more of: the HyperText Transfer Protocol (HTTP), the Representation state transfer (REST) computer architectural style, the Simple Object Access Protocol (SOAP), the Network File System (NFS) network communication protocol, the Server Message Block (SMB) network communication protocol, the Common Internet File System (CIFS) network communication protocol, the Portable Operating System Interface (POSIX), Apache® HDFS, Amazon S3®, among others.

Data Conversion

For various reasons it may be desired to convert data objects stored in a DDOS from a source data format to a target data format. For example, it may be desired to convert files in one data placement structure format (e.g., record columnar format) to files in another data placement structure format (e.g., optimized row columnar format) that provides a more space efficient way for the DDOS to store data.

In addition, it may be desired to convert data objects while the DDOS is live and available to process requests to access the data objects. For example, the requests to access may include requests that when processed by the DDOS create new data objects in the DDOS, read existing data objects, update existing data objects, and delete existing data objects in the DDOS.

It is a technical challenge to efficiently convert data objects stored in a DDOS from one data format to another while keeping the DDOS live and available to serve data access requests while the conversion is being performed. The shorter the amount of time needed to convert all data objects that need converting, the more efficient the conversion is.

A possible way to minimize the total conversion time might be to take the DDOS offline while the conversion is being performed. Unfortunately, while the DDOS is offline, it is not available to process requests to access the data objects being converted. Instead, those requests must be denied or must be queued for processing until after the conversion is complete. However, there may be thousands, millions, billions or more data objects encompassing terabytes, petabytes or more of data to convert. Converting such a large number of data objects may take a significant amount of time (e.g., hours or days or more). Meanwhile data in the DDOS is unavailable for access. Thus, taking the DDOS offline to do the conversion may be impractical in many circumstances such as where the data objects stored by the DDOS support, for example, end-user facing operations of an online application or otherwise where maximizing uptime of the DDOS for serving data access requests is important.

Another possible way to minimize the total conversion time might be to lock each data object for read-only access while it is being converted. This strategy does not require taking the entire DDOS offline. However, converting a large data object may still take a significant amount of time. For example, converting a data object storing database table data in record columnar format to a data object storing the database data in optimized row columnar format can take hours or more where the table data encompasses millions of database data items (e.g., rows) or more. Meanwhile data in the database table is unavailable for write access operations such as creating new data in the table and updating existing data in the table. Thus, locking a data object for the length of the entire conversion of the data object may be also inefficient or impractical in many circumstances.

Systems and methods disclosed herein address this and other issues.

Data Migration

For various reasons it may be desired to migrate data objects stored in one DDOS (the source DDOS) to another DDOS (the target DDOS). Such desire may be independent of, or in addition to, a desire for data conversion. For example, there may be a desire to migrate data objects in the source DDOS to the target DDOS because the target DDOS provides a better cost versus performance tradeoff than the source DDOS. For example, the source DDOS might be an on-premises DDOS and the target DDOS a cloud DDOS where the better data object access performance of the on-premises DDOS compared to the cloud DDOS is outweighed by the monetary cost of maintaining and administering the source DDOS on-premises.

A technical challenge associated with migrating data objects from the source DDOS to the target DDOS is allowing the source DDOS to remain live while the data objects are being migrated and also achieving eventual data consistency. While the source DDOS is live, data objects in the source DDOS can be created, read, updated and deleted. Thus, simply copying the data objects from the source DDOS to the target DDOS is sub-optimal. A data object can be updated or deleted in the source DDOS after it has been copied. These updated and deleted data objects would not be consistent with the data objects copied to the target DDOS. Further, new data objects can be created in the source DDOS while copying other data objects. These new data objects in the source DDOS would be inconsistent with the set of data objects that were copied to the target DDOS. As another complication, as mentioned above, the source DDOS may store a massive amount of data across a large number of data objects. Overall, migrating data objects in a reasonable amount of time while keeping the source DDOS live and with eventual consistency between the source DDOS and the target DDOS presents a significant technical challenge.

Systems and methods disclosed herein address this and other issues.

The approaches described in the above section are approaches that could be pursued, but not necessarily approaches that have been previously conceived or pursued. Therefore, unless otherwise indicated, it should not be assumed that any of the approaches described in this section qualify as prior art, or are well-understood, routine, or conventional, merely by virtue of their inclusion in this section.

DETAILED DESCRIPTION

Figure 1:
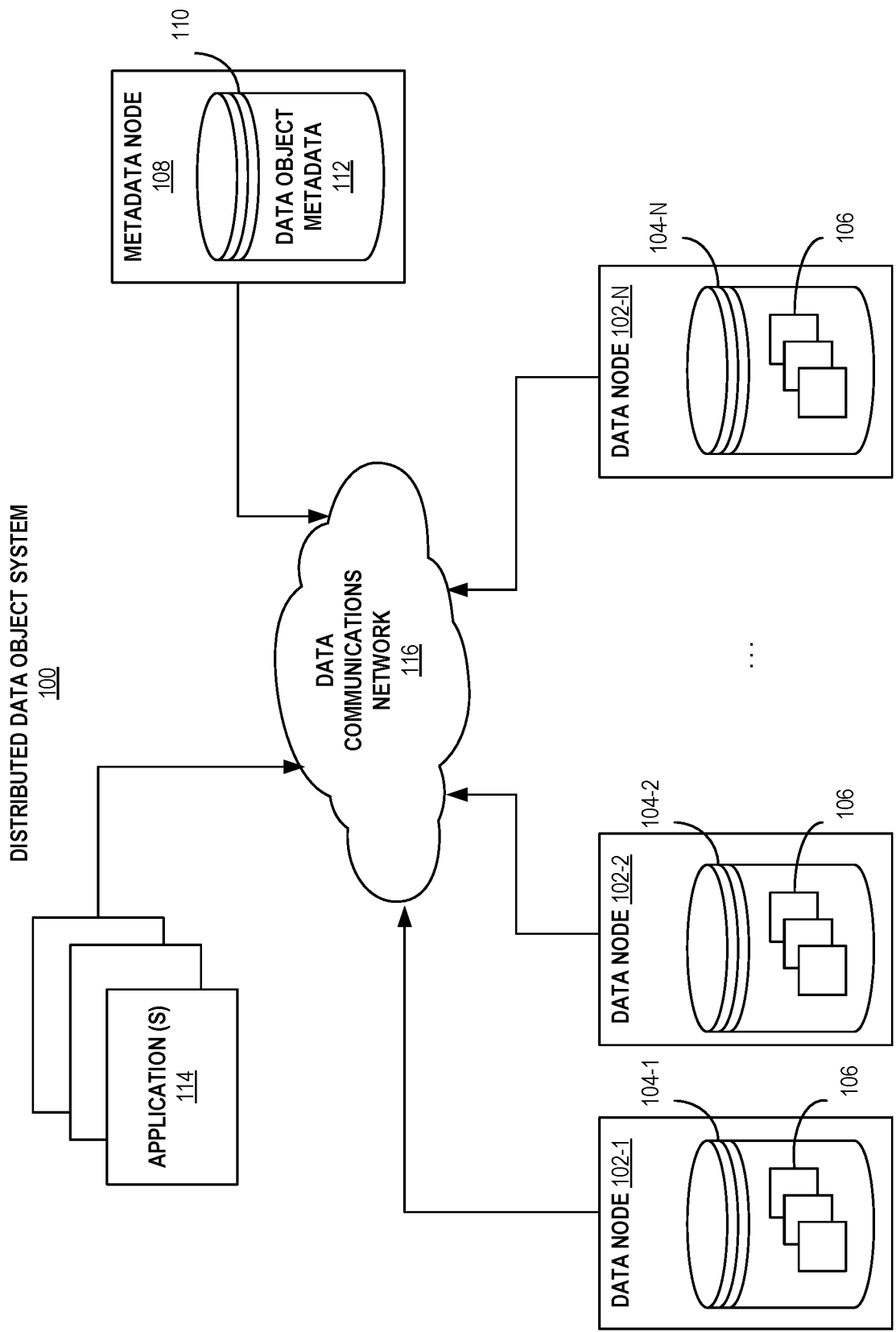
FIG. 1 illustrates an example distributed data object system.

In the following description, for the purposes of explanation, numerous specific details are set forth in order to provide a thorough understanding of various systems and methods for live data object conversion and migrating for distributed data object systems It will be apparent, however, that these systems and methods may be practiced without these specific details. In other instances, structures and devices are shown in block diagram form in order to avoid unnecessarily obscure aspects of the systems and methods.

Overview

Techniques are disclosed for converting the data of data objects stored in a DDOS from one data format to another while the system is live and available to process requests for access to the data objects being converted. Techniques are also disclosed for migrating data objects stored by the source DDOS from the source DDOS to the target DDOS while at least the source DDOS is live and available to process requests for access to the data objects being migrated.

In some implementations, the conversion techniques do not require taking the DDOS offline. The conversion techniques also do not require locking a data object for the entire conversion of the data object. Instead, a copy of the data object in a source data format is made in the target data format. The copy is made without holding a lock on the data object for the copy operation.

In some implementations, after the copy is made, a lock is acquired on the data object and signatures for the data object and signatures for the copy of the data object are compared to determine if there is additional data of the data object that needs to be copied to the copy of the data object. If no additional data needs to be copied, then the copy of the data object in the target data format replaces the data object in the source data format and the lock on the data object is released. The conversion of the data object from the source data format to the target data format is complete.

In some implementations, if additional data still needs to be copied, then a determination is made whether the amount of additional data than still needs to be copied is substantial. If there is not a substantial amount of additional data to copy, then, while continuing to hold the lock on the data object, the additional data is copied, the copy of the data object in the target data format replaces the data object in the source data format and the lock on the data object is then released. The conversion of the data object from the source data format to the target data format is complete.

In some implementations, if there is a substantial amount of additional data to copy, then the lock on the data object is released, then the additional data is copied. After the additional data is copied, the lock is reacquired and signatures are compared again. If there is new data that needs to be copied, then, while continuing to hold the lock on the data object, the new data is copied, the copy of the data object in the target data format replaces the data object in the source data format and the lock on the data object is then released. The conversion of the data object from the source data format to the target data format is complete.

According to some implementations, the conversion techniques reduce the period of time during the conversion during which the data object is locked and allow read and write access to the data object during the initial copy operation. The conversion techniques also achieve eventual consistency with any changes to the data object that occur during when the initial copy is made and while the data object is not locked.

In some implementations, the migration techniques are used to efficiently migrate a large set of data objects from the source DDOS to the target DDOS while at least the source DDOS remains live and available to process requests to access the data objects being migrated.

In some implementations, the migration techniques provide eventual consistency between data objects that are created, updated, or deleted in the source DDOS that are applicable to the migration and that occur while the migration is being performed.

Existing data object migration solutions create (e.g., fork) a new computing process for each data object to be copied. This is done at copy time, increasing the latency of each copy operation. For large numbers of data objects to be migrated, this per-copy operation process creation overhead can substantially slow down the overall migration operation. The per-copy operation process creation overhead may slow the rate at which data objects are migrated from the source DDOS to the target DDOS such that the rate at which data objects are migrated cannot "catch up" with the rate during the migration at which data objects are created, updated, and deleted in the source DDOS. In such a situation, the migration is perpetually "chasing" consistency between the source DDOS and the target DDOS.

In some implementations, the migration techniques use a set of long-lived processes to efficiently copy data objects from the source DDOS to the target DDOS thereby reducing or eliminating the computing overhead associated with creating a new process for each copy operation.

In some implementations, the migration techniques encompass comparing signatures for copied data objects to signatures for uncopied data objects stored in the source DDOS to efficiently identify additional data objects that need to be copied from the source DDOS to the target DDOS.

In some implementations, the migration techniques involve incrementally copying uncopied data objects stored in the source DDOS to the target DOS to ensure eventually consistency between the source DDOS and the target DDOS while the source DDOS remains live and available to process requests to access the data objects being migrated.

In some implementations, the migration techniques take advantage of the fact that the source DDOS maintains an inventory of data object signatures that can be used to efficiently identify uncopied data objects in the source DDOS without having to recompute those signatures.

In some implementations, the migration techniques encompass a fail and retry network connection scheme that aborts copying of data objects to the target DDOS over a network connection when the rate at which data can be sent over the network connection appears to be being throttled (limited or capped). In this case, the network connection is discarded, a new network connection is established that at least initially is not being throttled, and the copying resumes over the new unthrottled network connection.

Distributed Data Object System

The conversion and migration techniques disclosed herein operate in the context of a distributed data object system. FIG. 1 illustrates example distributed data object system 100. For brevity, the term "distributed data object system" is abbreviated herein with the initialism "DDOS." DDOS 100 may be used as the DDOS to which the conversion techniques are applied. DDOS 100 may be used as the source DDOS and/or the target DDOS to which the migration techniques are applied.

It is also possible for the both the conversion techniques and the migration techniques to be applied to the same DDOS 100. For example, the conversion techniques may be applied to data objects stored by the source DDOS. Then, after the conversion, the migration techniques may be applied to the converted data objects stored by source DDOS. As another example, the migration techniques may be applied data objects migrated to the target DDOS. Then, after the migration, the conversion techniques may be applied to the migrated data objects stored by target DDOS.

With respect to the conversion techniques, the DDOS can be an instance (cluster) of the Apache Hadoop® Distributed File System (HDFS) or other on-premises DDOS. No particular type of on-premises DDOS is required by the conversion techniques. It is also possible for the conversion techniques to be applied to a cloud DDOS.

With respect to the migration techniques, the source DDOS can be an instance (cluster) of the Apache Hadoop® Distributed File System (HDFS) or other on-premises DDOS and the target DDOS can be the Amazon Simple Storage Service® (Amazon S3®) or other cloud DDOS. However, there is no requirement that the source DDOS and the target DDOS be different types of distributed data object systems. For example, the source DDOS 100 can be one instance (cluster) of the Apache Hadoop® Distributed File System (HDFS) and the target DDOS 100 can be another instance (cluster) of the Apache Hadoop® Distributed File System (HDFS). Thus, there is also no requirement that the source DDOS be an on-premises DDOS and that the target DDOS be a cloud DDOS. As indicated, the migration techniques may be applied in any of the following circumstances: both the source DDOS and the target DDOS are on-premises DDOSs, both the source DDOS and the target DDOS are cloud DDOSs, or one of the source DDOS and the target DDOS is an on-premises DDOS and the other is a cloud DDOS.

DDOS 100 encompasses a plurality of data nodes 102-1, 102-2, . . . 102-N. Each of data nodes 102-1, 102-2, . . . 102-N may be implemented by a computing system of one or more computing devices. Computing device 700 of FIG. 7 described below is an example of a computing device. Data nodes 102-1, 102-2, . . . 102-N manage attached data storages 104-1, 104-2, . . . 104-N that collectively store data objects 106.

An attached data storage can be directly attached to a computing device. Storage system 710 of computing device 700 described elsewhere herein is an example of directly attached data storage. An attached data storage can be indirectly attached one or more data nodes such as via a data communications network (e.g., networked-attached data storage).

Internally, a data object of data objects 106 may be split into one or more blocks that are stored in a set of one or more of data nodes 102-1, 102-2, . . . 102-N. For example, a data object may be split into a set of one or more blocks of up to a predetermined size where the last or only block in the set may be less than the predetermined size. For example, the predetermined size might be 4 megabytes (MB), 64 MB, or 128 MB, as just some examples. The set of one or more blocks may be distributed over multiple of data nodes 102-1, 102-2, . . . 102-N. For example, the set of one or more blocks may be replicated over multiple of data nodes 102-1, 102-2, . . . 102-N for data redundancy purposes. Various replication techniques can be used. For example, three-times (3×) replication or erasure coding techniques may be used. No particular replication technique is required.

A data object of data objects 106 may be composed of "user data" and "format data." Requests for access to data objects 106 may be to create, read, update or delete user data. However, it is also possible for requests for access to data objects 106 to create, read, update or delete format data such as, for example, when converting data objects 106 or during other data object maintenance operations.

Format data structures and organizes user data within data objects 106. Format data is accessed and processed by a machine (computer) (e.g., accessed and processed by data nodes 102-1, 102-2, . . . 102-N) for accessing the user data. The format data may be only machine-readable or may be both machine-readable and human-readable.

In some examples described herein, the format data is based on the record columnar format or the optimized row columnar format. The record columnar format organizes columns of user data in record columnar manner. In particular, with the record columnar format, rows of user data are partitioned horizontally into "row splits," and the row splits are vertically partitioned in a columnar manner. The optimized row columnar format organizes user data like the record columnar format but does so in a way that requires less computer storage media space to store and organize the user data than does the record columnar format. More information on the record columnar format is available in the paper by Yongqiang He, Rubao Lee, Yin Huai, Zheng Shao, Namit Jain, Xiaodong Zhang and Zhiwei Xu, "RCFile: A Fast and Space-efficient Data Placement Structure in MapReduce-based Warehouse Systems," Proceeding of the IEEE International Conference on Data Engineering, pp. 1199-120, Apr. 11, 2011, the entire contents of which is hereby incorporated by reference. More information on Version 1 of the optimized row columnar format is available on the Internet at /specification/ORCv1 in the orc.apache.org domain, the entire contents of which is hereby incorporated by reference.

While format data can be based on a data placement format such as, for example, the record columnar format, the optimized row columnar format or the like, format data can be based on any file type or any media type (e.g., a media type recognized by an Internet Assigned Numbers Authority (IANA) standard). A file type of a data object may be indicated by its filename extension. Some non-limiting example filename extensions indicating file types include:
.aac, .aif, .aiff, .flac, .m4a, .mp3 and .mav for audio data objects;
.pdf, .ai, and .eps for Adobe® data objects;
.key, .pages and .numbers for Apple® data objects;
.jpg, .tiff, .gif, .svg, .svgz, .bmp, .png and .tif for image data objects;
.url, .webloc and .website for link data objects;
.doc, .docx, .docm, .dot, .dotx, .dotm, .ppt, .pptx, .pps, .ppsx, .ppsm, .pptm, .potm, .pot, .xls, .xlsx, .xslsm, .xlt, .xltx and .xltm for Microsoft® data objects;
.cr2, .crw, .nef, .nrw, .sr2, .dng, .arw and .orf for raw image data objects;
.csv, .txt, and .rtf text and rich-text data objects; and
.mov, .mp4, .m4v, .3gp, .3gpp, .3gpp2, .asf, .avi, .dv, .m2t, .mkv, .mpeg, .mpg, .mts, .oggtheora, .ogv, .rm, .ts, .vob, .webm, .wmv and .fly for video data objects.

The conversion techniques and the migration techniques do not require any particular format data type, file type or media type. Accordingly, examples described herein involving data placement formats are merely examples of possible format data types provided for purposes of illustrating principles of the conversion and migration techniques and are not intended to limit the techniques to any particular file type or set of file types or to any particular media type or set of media types.

Data Nodes

Data nodes 102 may be configured to provide access to data objects 106 to application(s) 114 over network 116. Such access may include creating, reading, updating, and deleting data objects 106 based on data object access commands sent from application(s) 114. The commands and data objects 106 (or portions thereof) may be transmitted over network 116 between application(s) 112 and data nodes 102 according to a data object access application programming interface (API). Such API may be based on a variety of different technologies including, but not limited to, any of the following technologies: the HyperText Transfer Protocol (HTTP), the Representation state transfer (REST) computer architectural style, the Simple Object Access Protocol (SOAP), the Network File System (NFS) network communication protocol, the Server Message Block (SMB) network communication protocol, the Common Internet File System (CIFS) network communication protocol, the Portable Operating System Interface (POSIX), Apache® HDFS, and Amazon S3®. In addition to supporting create, read, update, and delete operations on data objects 106, data nodes 102 may also perform block creation, deletion, and replication upon instruction from metadata node 108 over network 116.

In some instances, DDOS 100 provides to application(s) 114 a filesystem-like interface for data objects 106 such that the data objects 106 are stored in and accessed according to a filesystem-like hierarchy. In these instances, data objects 106 might be referred to as files. For example, DDOS 100 may allow access to a file named "foo" at filesystem-like path "/A/B/C/foo" where A, B, and C are names of folders in the filesystem-like hierarchy.

Metadata Node

DDOS 100 also encompasses metadata node 108 that stores in attached data storage 110 metadata 112 about data objects 106. Like a data node, metadata node 108 may be implemented by a computing system of one or more computing devices (e.g., computing device 700 of FIG. 7). Like a data node, metadata node 108 can be implemented by a computing system of one or more computing devices and may be configured with software or other computer-implemented logic for performing metadata node functions. Similar to an attached data storage of a data node (e.g., 104-1), attached data storage 110 for storing data object metadata 112 can be directly attached or network-attached.

Metadata node 108 stores and manages data object metadata 112 about data objects 106. For each data object 106, data object metadata 112 may encompass various information about a current or recent state of the data object as stored in DDOS 100. Information about a data object that data object metadata 112 may contain may include all of the following information, a superset of this information, or a subset thereof:
a size of the data object (e.g., in bytes),
a creation timestamp reflecting when the data object was created in DDOS 100,
a last modified timestamp reflecting when the data object was recently modified/updated in DDOS 100,
a filesystem like-path to the data object in a filesystem-like hierarchy supported by DDOS 100,
a file type of the data object,
a filename of the data object,
a media type of the data object,
a name of the data object, and
a signature of the data object.

With regard to the file type of the data object, the file type may correspond to a filename extension such as, for example, .doc, .docx, .pdf, .jpg, .txt, .csv, etc. With regard to the media type of the data object, the media type may correspond to a media type registered with the Internet Assigned Numbers Authority (IANA). A list of media types is available on the Internet at /assignments/media-types/media-types.xhtml in the iana.org domain, the entire contents of which is hereby incorporated by reference.

With regard to a signature of the data object, the signature may reflect the contents of the data object in a summary form. For example, the signature may be a cyclic redundancy check (CRC) value or a checksum value (e.g., a message digest checksum value). For example, the signature may be computed in a hash tree or Merkle tree-like fashion. For example, the signature may be a MD5 checksum of a set of concatenated block-level MD5 checksums computed from blocks of the data object where each block-level MD5 checksum is a MD5 checksum of a set of concatenated block-level CRC values computed from chunks of the block. This signature is dependent on the size of the blocks and chunks. As a result, a signature computed in this way for the same data object may nonetheless be different for different DDOS systems that use different chunk and/or block sizes. As result, signatures computed for the same data object by the different DDOS systems may not match even though the data object has identical contents in both instances.

In some instances, the signature of a data object stored in data object metadata 112 is computed as a data object-level composite CRC value that allows for signature comparisons between different DDOS systems with different underlying block and/or chunk configurations. For example, information on computing the composite CRC value for a data object is described in the following documents: (1) Dennis Huo, "New file checksum feature lets you validate data transfers between HDFS and Cloud Storage," Mar. 6, 2019, available on the Internet at /blog/products/storage-data-transfer/new-file-checksum-feature-lets-you-validate-data-transfers-between-hdfs-and-cloud-storage in the cloud.google.com domain, and (2) Andrew Kadatch and Bob Jenkins, "Everything we know about CRC but afraid to forget," Sep. 3, 2010. The entire contents of each of these documents is hereby incorporated by reference as if fully set forth herein.

Other CRC-based and/or checksum-based signatures are possible, and the conversion and migration techniques are not limited to any particular signature computation method. Any probabilistically unique signature computation method for which collisions for non-identical contents are relatively rare may be used. Some non-limiting examples of suitable signature computation methods are provided herein.

Applications

One or more applications 114 are interconnected with data nodes 102-1, 102-2, . . . 102-N and metadata node 108 via data communications network 116.

Application(s) 114 can be any computer-based applications that access data in data objects 106. Such access may include creating, reading, updating, and deleting format data and/or user data in data objects 106 including creating new data objects 106 in DDOS 100 and deleting existing data objects 106 from DDOS 100.

Application(s) 114 may include, for example, map-reduce application, database application, data analytic applications, data warehouse applications, or any other software application that uses data in data objects 106 to provide a user feature or perform an information processing function. Techniques disclosed herein allow application(s) 114 to access data objects 106 including creating new data objects 106 and modifying and deleting existing data objects 106 while data objects 106 in DDOS 100 are being converted and/or data objects 106 are being migrated from DDOS 100 to another DDOS. That is, DDOS 100 can remain "live" while the conversation and/or migration of data objects 106 is taking place. In some instances, the conversion techniques disclosed herein and the migration techniques disclosed herein are implemented by one or more applications 114.

The above-described DDOS 100 is presented for purposes of illustrating the basic underlying components of a DDOS that may be employed in an implementation. For purposes of discussion, the following description will present certain examples in which it will be assumed that certain computing systems ("data nodes") store data objects and other certain computing systems ("metadata nodes") store metadata about the data objects. Implementations of the techniques disclosed herein, however, are not limited to any particular DDOS configuration. In particular, a data node/metadata node distinction is not necessary, but is used to provide a framework for discussion. Instead, implementations of the techniques disclosed herein may be implemented in any type of DDOS architecture or processing environment capable of supporting the conversion and/or migration techniques presented herein.

Example User Activity Workflow

The conversion techniques and the migration techniques are also agnostic with respect to the type of user data stored in data objects 106. One non-limiting example of the type of user data that may be stored in data objects 106 is user activity data reflecting end-user activity using an online service such as, for example, a large-scale Internet service.

The collected user activity data can be processed using distributed computing techniques (e.g., map-reduce processing or the like) to generate reports that can be delivered to executives, system managers, and/or others within the online-service provider's organization. These reports can guide decision processes, such as adding new capacity or developing or enhancing service offerings.

Analytics systems depend on data and data availability. Data for reports can come from "raw" data, such as logs of user activity, or previously processed data and can be processed through a series of processing jobs (e.g., Map/Reduce jobs) defined by an operator of the analytics system (also referred to as an "analyst"). For instance, a report on system usage patterns may be created by running a first job to process a log of user activity to identify all user identifiers that logged in at least once in a 24-hour period, then running a second job to group the user identifiers according to some metric of interest (e.g., demographics, geographic location, etc.). In this regard, some of data objects 106 may contain user activity data that each covers a corresponding time period. For example, some of data objects 106 may each cover a particular hour on a particular day. Others of data objects 106 may each cover longer time periods and contains aggregations of user activity data in data objects 106 covering more fine-grained time periods. For example, the one hour data objects 106 may be aggregated by the series of processing jobs into data objects 106 that each cover one day, and the daily data objects 106 can be aggregated by the series of processing jobs into data objects 106 that each cover one week, and the weekly data objects 106 can be aggregated by the series of processing jobs into data objects 106 that each cover 28-days, etc. The result of continually collecting user activity data and processing (aggregating) the collected data through the series of processing jobs is that DDOS 100 may store a huge amount of data (e.g., tens of petabytes or more) across a large number of data objects 106 (e.g., hundreds of millions or more). The online-service provider may wish to convert and/or migrate the large-amount of collected and aggregated data objects. Techniques disclosed herein can help with these tasks.

Figure 2:
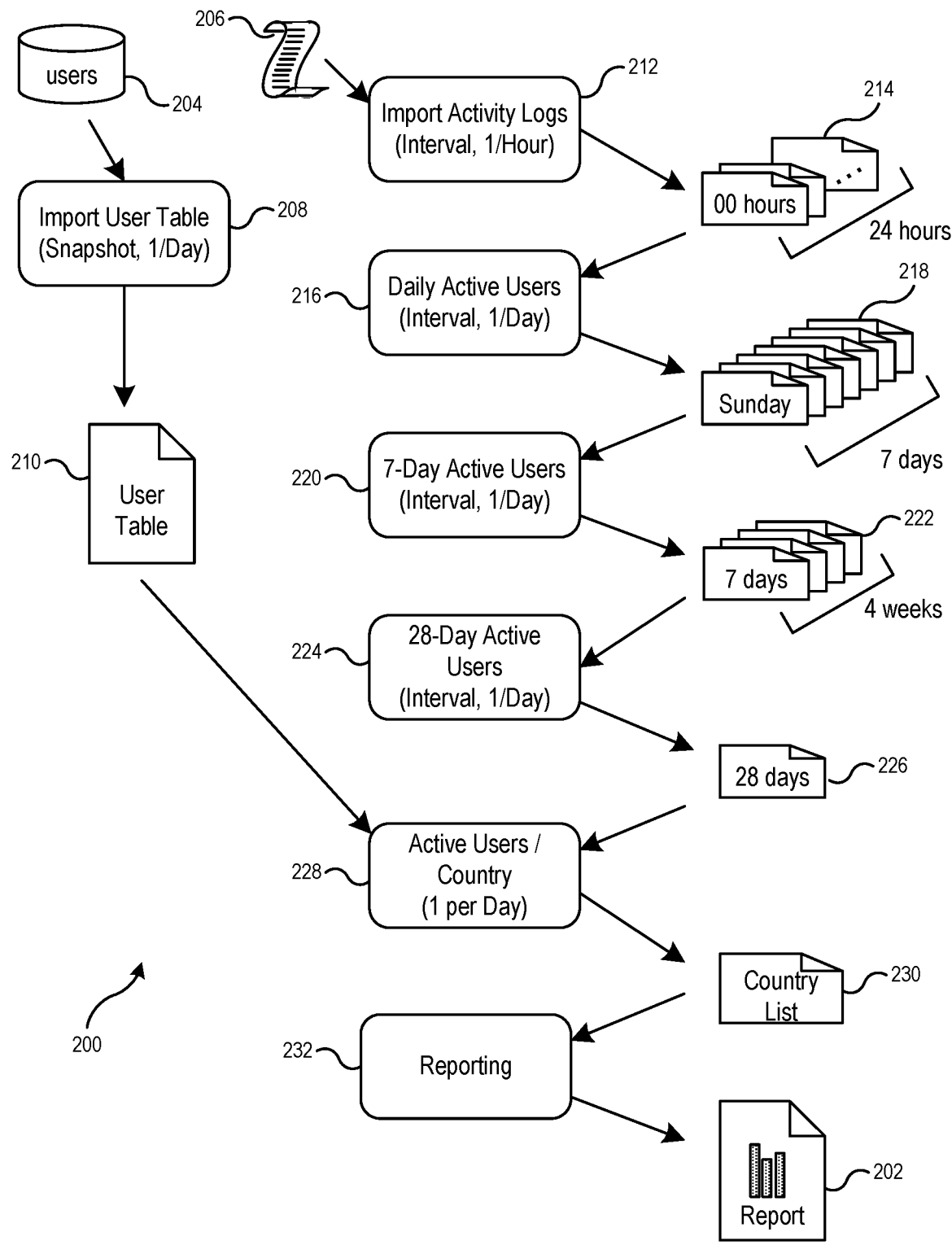
FIG. 2 illustrates an example processing workflow for producing user activity data stored in data objects of the example distributed data object system.

FIG. 2 shows an example workflow 200 that can be defined and executed based on data objects 106 stored in DDOS 100. Workflow 200 produces a report 202 summarizing information about active users of an online service per country over a 28-day period. Report 202 can be produced in any format desired (e.g., text, graphics, etc.) and can include, e.g., the number or percentage of active users who hail from each country.

To produce this information, workflow 200 relies on information about the active users of the online service, such as a user identifier and country of each active user. Portions of this information can be extracted from a user database 204 maintained by the provider of the online service, e.g., using a customer account manager. User database 204 can contain a record for each user that can include a user identifier (any unique identifier, e.g., a login name, email address, or account number, that a user would be expected to provide when interacting with the online service) and other data about the user, such as a country identifier. A new record can be added to user database 204 upon creation of each user account, and the account creation process can include asking the new user to identify her country of residence or citizenship. Other techniques can be used to populate user database 204, and process 200 can proceed independently of the manner in which user database 204 is populated.

In addition, since the report is based on active users (defined for purposes of this example as users who interacted with the online service at least once during the relevant time period), workflow 200 requires information about which users interacted with the online service and when. This information can be obtained from activity logs 206 maintained by the online service provider, e.g., using a logging system. Logs 206 can include an entry for each transaction of a user with the online service (or for selected transactions), and each entry can indicate the date/time, the type of transaction (e.g., logging in or out, uploading or downloading a file, purchasing an item, posting content, etc.), the user identifier, and other information as desired.

Workflow 200 can include jobs that import the data from external sources such as user database 204 and activity logs 206 into an analytics database. For example, "import user table" job 208 can read user database 204 and create or update a snapshot user table 210 that is stored in the analytics database. User table 210 can be a snapshot of user database 204 as of a cutoff time associated with generation of report 202. Job 208 can be a job that is scheduled to run periodically (e.g., once per day). Job 208 can be implemented to create an initial snapshot and update the snapshot based on activity logs, rather than repeatedly processing user database 204.

Similarly, "import activity logs" job 212 can read an activity log 206 that covers a relevant time interval (in this case, a one-hour period) and generate a database table 214 that can include a deduplicated list of all user identifiers that had at least one transaction entry in activity log 206.

The table can include other information, such as how many or what kind(s) of transactions were logged for each user identifier. Like job 208, job 212 can be a job that is scheduled to run periodically (e.g., once per hour). Unlike job 208, job 212 can be an interval job that generates a separate data table 214 for each hour's activity log 206. Accordingly, job 212 can generate hourly activity data tables 214 at a rate of 24 tables per day, and tables 214 can be retained for as long as desired (e.g., 30 days, 90 days, one year). Hourly activity data tables 212 can be consumed by a number of different jobs including later jobs within workflow 200 as well as other jobs (not shown) outside workflow 200. For instance, hourly activity data tables 212 can be used to generate statistical data regarding system usage over the course of a day.

For purposes of generating a report covering a 28-day period, hourly activity data tables 214 can be aggregated by subsequent jobs. For example, "daily active list" job 216 can merge 24 hourly data tables 214 into a single (deduplicated) daily data table 218. Like job 212, job 216 can be an interval job that generates a separate data table 218 for each day. Accordingly, job 216 can generate daily activity data tables 218 at a rate of one table per day, and tables 218 can be retained for as long as desired (e.g., 30 days, 90 days, one year). Like hourly activity data tables 214, daily activity data tables 218 can be consumed by a number of different jobs including later jobs within workflow 200 as well as other jobs (not shown) outside workflow 200.

Similarly, "7-day active list" job 220 can merge seven daily data tables 218 into a single (deduplicated) seven-day data table 222. In this example, job 220 can be executed daily to produce successive tables 222 to cover a rolling seven-day period, with each successive pair of tables 222 including six days of overlapping data. Accordingly, job 220 can generate seven-day activity data tables 222 at a rate of one table per day, and tables 222 can be retained for as long as desired (e.g., (e.g., 30 days, 90 days, one year). Like hourly activity data tables 212 or daily activity data tables 218, seven-day tables 222 can be consumed by a number of different jobs including later jobs within workflow 200 as well as other jobs (not shown) outside workflow 200.

One consumer of seven-day tables 222 can be "28-day active list" job 224, which can merge four contiguous (but non-overlapping) seven-day tables into a single table 226 listing all active users for a period of 28 days. Like job 220, job 224 can run daily to produce a table 226 that covers a rolling 28-day period, with consecutive tables 226 including 27 days of overlapping data.

"Active users per country" job 228 can perform a join operation on 28-day activity table 226 and user table 210 (which lists all registered users) to determine a country for each active user, thereby producing a country list 230. In various embodiments, country list 230 can include a table associating each active user identifier with a country and/or statistical information such as the number of active user identifiers per country. Like jobs 220 and 224, job 228 can run daily to produce successive lists 530 covering a rolling 28-day period.

Reporting job 232 can generate a report based at least in part on country list 230. For example, if country list 230 includes statistical information, reporting job 232 can format the statistical information in a user-readable form (e.g., a table, graph, or the like), and create report 202 (e.g., a data file such as a PDF or HTML document) that includes the information. If country list 230 includes a data table, reporting job 232 can include computing statistical information based on the data table as well as formatting the information and creating a user-readable report. In some embodiments, reporting job 232 can include delivering report 202 to one or more end users (e.g., analysts, executives, or other employees of the online service provider), e.g., via email, Intranet document repository, or the like.

Reporting job 232 can also incorporate data from other workflows (not shown) into the report. For instance, active users can be analyzed in a variety of demographic dimensions (e.g., age, gender, education level, income level, etc.) provided that corresponding information about registered users is available. Quantity and or type of user activity can be statistically analyzed and reported on.

Workflow 200 is intended as illustrative of workflows that can be defined in an analytics system to produce data stored in data objects 106. For example, data stored in any of tables 210, 214, 218, 222, and 226 can be stored in data objects 106. It is to be understood that the details of the workflow can be varied and different workflows with different reports may be used. For example, if there is not a need for a rolling seven-day activity report, job 220 can be scheduled to execute weekly rather than on a rolling daily basis. Further, it is to be understood that multiple workflows can be defined in an analytics system and that different workflows can have interdependencies, such that a single source job can produce data that is consumed by multiple sink jobs that perform different operations. For instance, as noted above, a job in a workflow that produces a report on service usage per hour can consume hourly activity data tables 214.

Conversion and/or Migration Computing Environment

Figure 3:
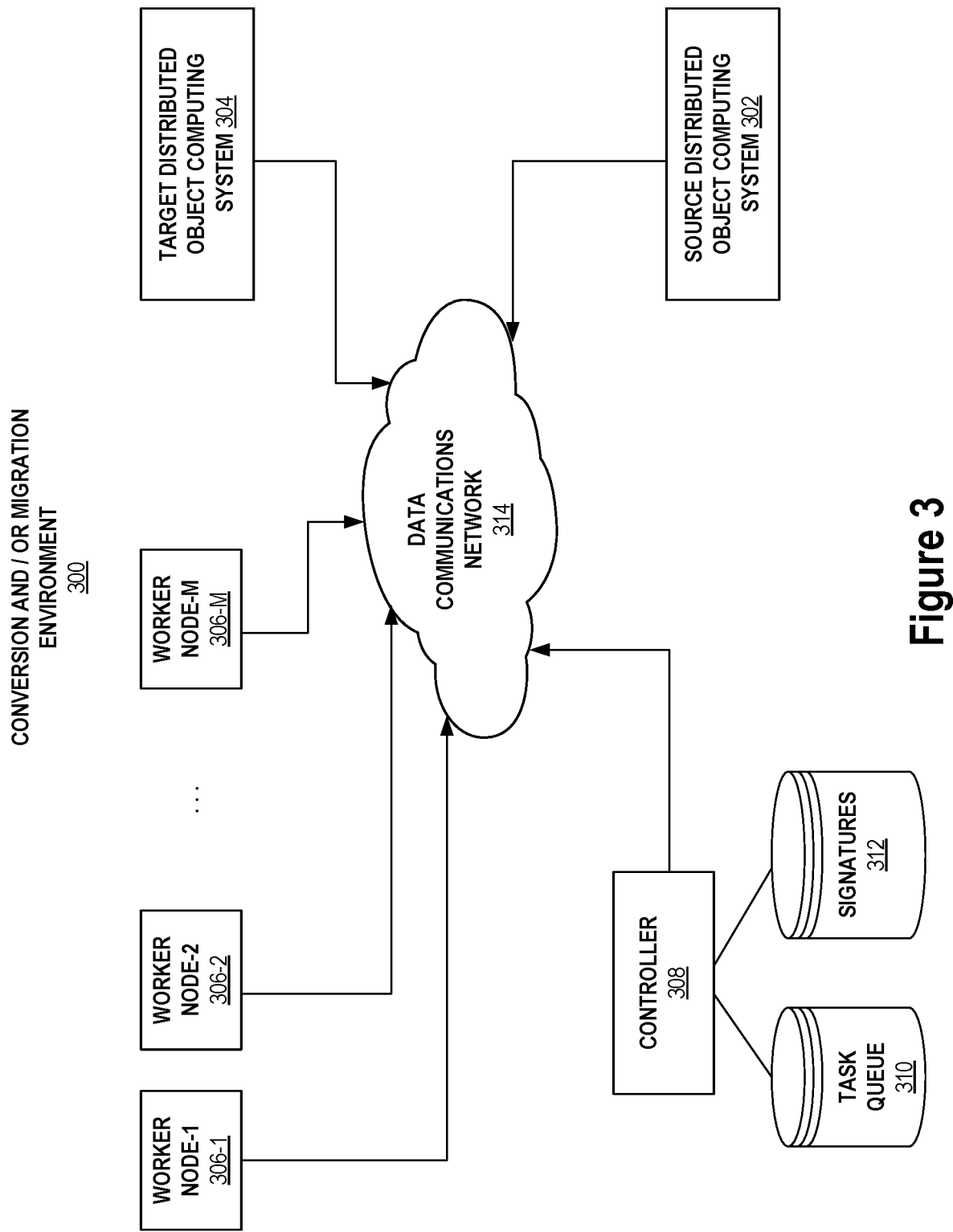
FIG. 3 depicts an example computing environment in which the conversion techniques and/or the migration techniques may be performed.

FIG. 3 depicts example computing environment 300 in which the conversion and/or the migration techniques may be performed. Environment 300 includes a source DDOS 302, a target DDOS system 304, a set of worker nodes 306, and a migration controller 308 interconnected via data communications network 314.

It should be noted that data communications network 314, and likewise data communications network 116 of FIG. 1, may actually be composed of multiple sub-networks such as, for example, multiple Internet Protocol (IP)-based networks. Thus, networks 116 and 314 broadly represent any data communication network or set of networks that allow computing devices to send network messages (e.g., packets) to other computing devices and that allow computing devices to receive network messages sent from other computing devices. Migration controller 308 also has access to task queue 310 and signatures database system 312 which are explained in greater detail below.

The conversion techniques and/or the migration techniques can be performed in environment 300. If just the conversion techniques are performed in environment 300, then the conversion techniques may be performed on data objects stored in source DDOS 302 or target DDOS 304. In this case, environment 300 may not include one of source DDOS 302 or target DDOS 304.

In the following discussion of the conversion techniques, reference is made by example of performing the conversion techniques on data objects stored in source DDOS 302 before the converted data objects are then migrated to target DDOS 304. However, it should be understood that the data objects stored in source DDOS 302 can be migrated according to the migration techniques to target DDOS 304 without performing the conversion techniques. It should also be understood that the conversion techniques can be performed on data objects migrated to the target DDOS 304 from the source DDOS 302. Similarly, the conversion techniques can be performed on data objects in the source DDOS 302, the converted data objects migrated to the target DDOS 304 according to the migration techniques and then the conversion techniques performed again on the data objects migrated to the target DDOS 304. It should also be understood that the conversion techniques and the migration techniques can be performed concurrently. For example, some data objects stored by the source DDOS 302 can be converted according to the conversion techniques while other already converted data objects are being migrated to the target DDOS 304 according to the migration techniques.

In operation, data objects stored in source DDOS 302 are converted from a source data format to a target data format. In some instances, as mentioned previously, the source data format is the record columnar format and the target data format is the optimized row columnar format. However, the conversion techniques may be more generally applied to any source file or media type to any target file or media type. Further, the data objects converted can encompass multiple different source file or media types and multiple different target file or media types. Further, converting a data object may encompass changing or transforming just the format data of the data object or changing or transforming both the format data and the user data of the data object.

The data objects stored in source DDOS 302 to be converted may be selected according to a conversion criterion. For example, the conversion criterion may select all data objects stored in source DDOS 302 or a subset thereof. If a subset, the conversion criterion may select data objects to copy based on data object metadata 112 of source DDOS 302. For example, the conversion criterion may select to convert data objects stored in source DDOS 202 based on the size of the data object, the creation timestamp for the data object, the last modified timestamp for the data object, the filesystem like-path for the data object, the file type of the data object, the filename of the data object, the media type of the data object, and/or the name for the data object. Thus, the conversion criterion can be based on a single attribute of the data objects (e.g., all data objects having a filesystem-like path where a prefix of the path matches a specified path prefix). For example, the path prefix might be "/A/B" or "/A/B/" such that the conversion criterion selects all data objects stored in source DDOS 302 having a filesystem-like path being "/A/B" or "/A/B/" or starting with "/A/B" or "/A/B/." Alternatively, the conversion criterion can be based on multiple attributes of the data objects (e.g., all data objects having a specified filename extension and having a creation timestamp after a specified time). Other conversion criterion is possible, and no particular attribute or combination of attributes is required.

Likewise, the data objects stored in source DDOS 302 to be migrated to target DDOS 304 may be selected according to a migration criterion. The migration criterion may be the same as the conversion criterion, if conversion is being performed. Or the migration criterion may be different from the conversion criterion, even if conversion is being performed. Like the conversion criterion, the migration criterion can be a single data object attribute or a combination of multiple data objects stored in data object metadata 112 of source DDOS 302.

To convert or migrate selected data objects, a set of worker nodes 306 (worker pool) may be used. Each worker node 306 may be implemented as a computing system composed of one or more computing devices. Each worker node 306 may execute one or more long-lived worker processes. A long-lived worker process may convert or migrate multiple data objects between being created (forked) and being terminated (killed). By doing so, the process creation overhead of creating (forking) a new process is amortized over multiple data object conversions or migrations.

As used herein, the term "process," as in long-lived worker process, encompasses the combination of a program (e.g., an application program or other set of instructions) being executed on an operating system and associated bookkeeping information used by the operating system. When a program is executed, the operating system may create a new process for each instance of the program being executed. The process is like an envelope for the program which identifies the executing instance with a process number (e.g., a process identifier or "process ID") and associates other bookkeeping information to the process. One skilled in the art will appreciate that a "process" as just defined may, without limitation, refer to any of a heavyweight process, a thread, or a lightweight process.

Set of worker nodes 306 may be horizontally scalable. For example, to increase the overall bandwidth of converting or migrating data objects, more worker nodes 306 can be added to the worker pool. Set of worker nodes 306 in the worker pool can execute long-lived worker processes concurrently such that the long-lived worker processes convert and/or migrate data objects concurrently thereby reducing the overall time (latency) of converting or migrating a set of data objects. In other words, the task of converting a set of data objects or the task of migrating a set of data objects can be parallelized over the long-lived worker processes that execute concurrently on set of workers nodes 306 by having some of worker nodes 306 convert or migrate some data objects while others of worker nodes 306 convert or migrate others of the set of data objects.

The nature of converting and migrating data objects include I/O-bound operations (as opposed to CPU-bound operations) with respect to worker nodes 306. For example, conversion and migration operations may involve worker notes 306 reading data from source DDOS 302 over network 314 and worker nodes 306 sending data to source DDOS 302 or target DDOS 304 over network 314. Thus, worker nodes 306 can execute many more long-lived worker processes than there are CPUs or processor cores of worker nodes 306. For example, there may be 10 times, 100 times, a 1,000 times or more long-lived worker processes executing at worker nodes 306 performing conversion and/or migration operations than there are CPUs or processor cores of worker nodes 306.

Controller 308 coordinates the conversion of data objects in source DDOS 302 or target DDOS 304 and/or coordinates the migration of data objects from source DDOS 302 to target DDOS 304. Controller 308 may monitor worker nodes 306 and the long-lived worker processes executing thereon including allocating more long-lived worker processes at the worker nodes 306 to increase the conversion and/or migration bandwidth. Such allocation may involve controller 308 sending network messages to worker nodes 306 to create (spawn) additional long-lived worker processes at worker nodes 306.

Controller 308 may also provide to long-lived worker processes access to task queue 310 and signatures database 312 over data communications network 314. Task queue 310 may encompass identifiers of a set of data objects stored in source DDOS 302 or target DDOS 304 to be converted or migrated. When a long-lived worker process at a worker node is ready to convert or migrate a data object, it may message migration controller 308 over network 314 which in turn provides to the long-lived worker process one or more identifiers of one or more data objects to be converted or migrated from task queue 310. Long-lived worker processes may periodically poll migration controller 308 for identifier(s) of data object(s) to be converted or migrated. If the task queue 310 is empty or otherwise does not store identifiers of data objects to be converted or migrated, the controller 308 may indicate this to the long-lived worker processes when the processes poll (query) the controller 308 for new data objects to convert or migrate. Long-lived processes may continue to periodically poll the controller 308 for new conversion or migration tasks until such task are ready in task queue 310.

Controller 308 may determine identifiers of data objects in source DDOS 302 to be converted, may determine identifiers of data objects in target DDOS 304 to be converted, or may determine identifiers of data objects in source DDOS 302 to be migrated to target DDOS 304. To do this, controller 308 may query data object metadata 112 at the metadata node 108 of source DDOS 302 or target DDOS 304 for data objects that satisfy the conversion criterion or the migration criterion. Alternatively, a snapshot (export) of data object metadata 112 (e.g., in comma-separated-value (csv) format) make be captured from metadata node 108 of source DDOS 302 or target DDOS 304. The snapshot (exported) may then be queried for data objects satisfying the conversion criterion or the migration criterion. Identifiers of data objects at source DDOS 302 or target DDOS 304 to converted or migrated may be stored by controller 308 in task queue 310. Controller 308 may assign data objects in source DDOS 302 or target DDOS 304 to be converted or migrated to worker nodes 306 based on identifiers of data objects to be converted or migrated in task queue 310.

Data objects in source DDOS 302 or target DDOS 304 may be converted or migrated in batches. For example, controller 308 may obtain identifiers of data objects in source DDOS 302 or target DDOS 304 to be converted or migrated and store those identifiers in task queue 310. Once worker nodes 306 have converted or migrated the data objects and there are no more data objects to be converted or migrated according to task queue 310, then controller 308 may obtain identifiers of any still unconverted or unmigrated data objects in source DDOS 302 or target DDOS 304. These unconverted or unmigrated data objects may be data objects newly stored, recently modified, or recently deleted in source DDOS 302 or target DDOS 304 after the initial set of data objects to be converted or migrated was obtained or while the initial set of data objects was being converted or migrated. Data objects may be converted or migrated in batches like this repeatedly until there are no longer any data objects matching the conversion criterion or the migration criterion to be converted or migrated.

Controller 208 may also access signatures database 212. Signatures database 212 may store signatures for data objects converted or migrated. Signatures in signatures database 202 may be compared to determine if there are unconverted data objects in source DDOS 302 or target DDOS 304 to be convert or unmigrated data objects in source DDOS 302 to be migrated to target DDOS 204. For example, signatures database 312 is a relational database management system that facilitates efficient bulk comparison of sets of signatures by way of structure query language statements submitted by controller 308 to signatures database 312.

When worker nodes 306 migrate data objects from source DDOS 302 to target DDOS 304, the data objects may be streamed from source DDOS 302 to target DDOS 304 through the long-lived worker processes executing at worker nodes 306. In particular, a long-lived worker process at a worker node may read data from a data object stored in source DDOS 202 as a sequence of blocks, chunks, segments, or parts that is received at the worker node over data communications network 314 from source DDOS 302 and send the sequence of portions over data communications network 314 to target DDOS 304 for storage as part of a corresponding data object in target DDOS 304 such that only a portion of the sequence of portions is stored at the worker node at any given time and the entire sequence is not stored all at once at the worker node. By streaming, greater migration concurrency may be realized at the worker node (more data objects may be migrated at the same time) because at any given time each of the long-lived worker processes concurrently executing at the worker node may consume less data storage space (e.g., volatile memory space) at the worker node.

A long-lived worker process at a worker node may migrate (stream) data objects over a network connection (e.g., a Transmission Control Protocol (TCP) connection) established over the data communications network 314 between the worker node and a network endpoint device associated with the target DDOS 304. For example, the network endpoint device can be a network router, server, load balancer, or other network endpoint device connected via one or more data networks with target DDOS 304. The network endpoint device can also be a data node 102 of target DDOS 304. In either case, the network endpoint device may throttle (limit or cap) that rate at which data can be sent to the network endpoint device over the network connection in order to protect the network endpoint device from being over-burdened or as a denial-of-service prevention measure. The throttle may not be activated by the network endpoint device until after some data objects have already been successfully copied over the network connection. However, if the network connection is throttled by the network endpoint device, then the rate at which data objects can be copied (streamed) over the network connection is also consequently throttled (limited or capped). If this throttling happens across many network connections used by long-lived worker processes in the worker pool, then the overall data object migration rate of data objects from the source DDOS 302 to the target DDOS 304 is also throttled.

As a mitigation against throttling by network endpoint devices associated with target DDOS 204, network connections established between worker nodes 306 and the network endpoint devices may be terminated, and new network connections established, upon detecting a network connection that appears to be being throttled. For example, the rate at which data is transmitted over the network connection may be measured for a period of time (e.g., in bits or bytes per second). And if the measured rate is below a minimum expected rate, then the network connection may be terminated, and a new network connection established with a network endpoint device associated with target DDOS 304, which may the same or different network endpoint device that the terminated network connection was established with. The new network connection may not be throttled for some time, if at all, after it is established. Prior to any throttling on the new network connection, data objects may be streamed to target DDOS 304 over the new network connection at a data transfer rate that is greater than the throttled rate at which the data objects would have been transferred over the old, now terminated network connection. If a data object is in the process of being transferred over a network connection when a decision is made to terminate the network connection, then the transfer of the data object may be allowed to complete before the network connection is terminated. Alternatively, the network connection may be terminated part way through transfer of the data object, and the data object entirely transmitted again over the new network connection. The expected data transfer rate may be determined empirically based on user experience. For example, the expected data transfer rate may be a configuration parameter at the worker nodes 306.

Conversion Method

Figure 4:
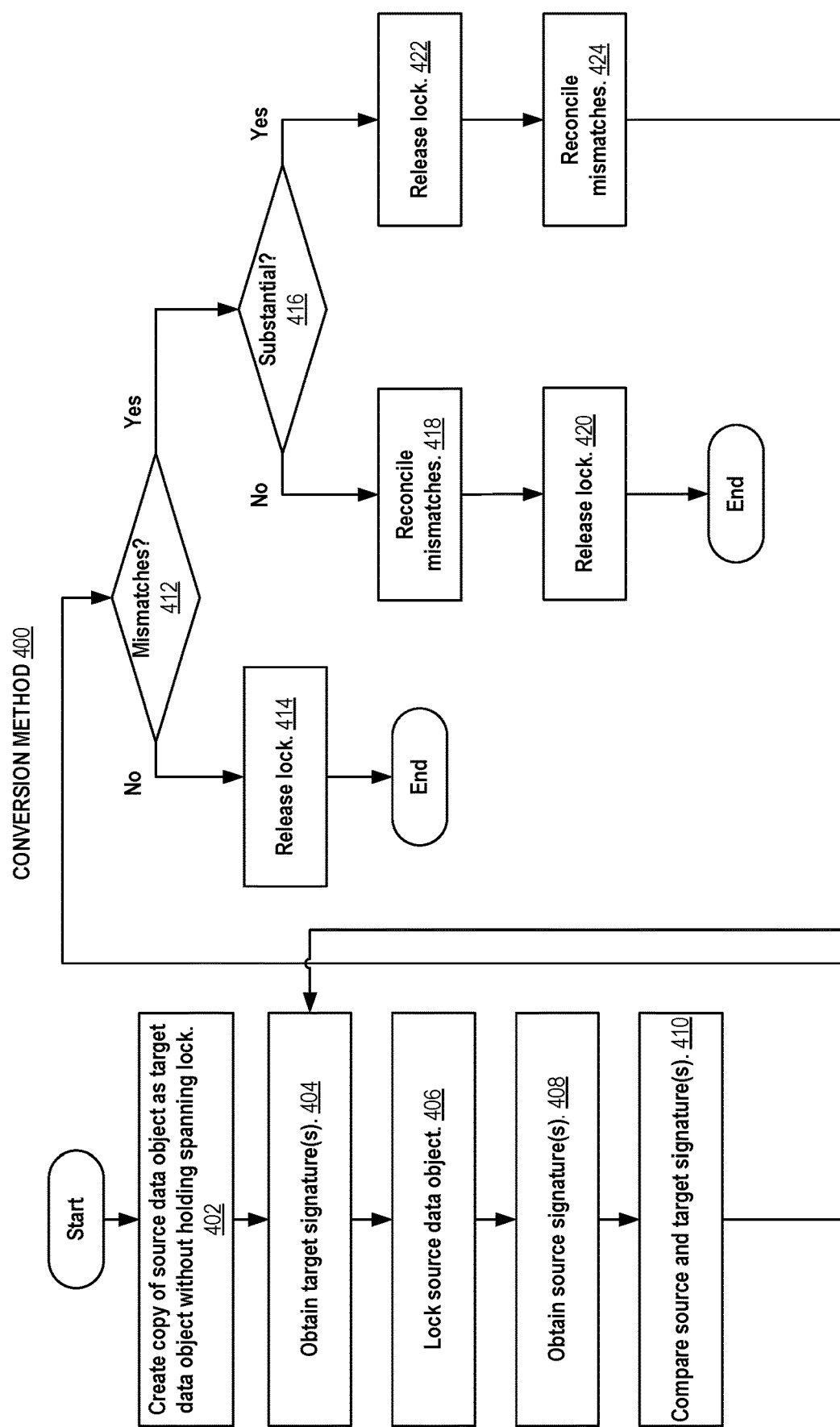
FIG. 4 is a flowchart of an example method for converting a data object from a source data format to a target data format.

FIG. 4 depicts example method 400 for converting a data object stored by a DDOS from a source data format to a target data format. For example, method 400 may be involved in converting hundreds, thousands, millions, billions or more data objects. Method 400 provides large-scale data object conversion for the DDOS while allowing the DDOS to remain live and accept and process requests to access the data objects being converted.

Method 400 may be performed by a long-lived process executing at a worker node to convert a data object in the DDOS from the source data format to the target data format. For example, long-lived processes at set of worker nodes 306 may each perform method 400 to convert a data object in source DDOS 302 or target DDOS 304. Thus, method 400 can be performed concurrently by multiple long-lived processes to parallelize the task of converting data objects.

A long-lived process may perform method 400 multiple times to convert multiple data objects. For example, long-lived processes executed at set of worker nodes 306 may each perform method 400 multiple times to convert multiple data objects in source DDOS 302 or target DDOS 304. Thus, the number of long-lived processes converting data objects may be substantially fewer than the number of data objects converted.

No particular source data format and no particular target data format is required by method 400. For example, the source data format may be the record columnar format and the target data format may be the optimized row columnar format. Method 400 can be used to convert data objects between virtually any two different file types or media types.

Different data objects can be converted between different source and target data formats depending on the file type or media type of the data objects. As just an example, data objects in record columnar format can be converted to optimized row columnar format while data objects in a first digital image format can be converted to a second digital image format. Thus, method 400 can be performed to convert different type data objects between different data format pairs.

Converting a data object by method 400 can involve not just changing the format data of the data object but also the user data of the data object. For example, conversion of data object by method 400 may encompass translating, transforming, compressing, decompressing, encrypting and/or unencrypting user data of the data object. Thus, data object conversion by method 400 can encompass changing just the format data of the data object or changing both the format data and the user data of the data object.

In summary, method 400 proceeds to convert a data object in a source data format by creating 402 a "copy" of the data object where the copy is in the target data format and without using a spanning lock for the entire copy 402 operation. For ease of understanding the discussion of method 400 that follows, the data object being converted is referred to as the "source" data object. And the copy of the data object in the target data format is referred to the "target" data object.

It should be noted that since the source data format and the target data format are different data formats, the source data object and the target data object are not identical copies. Rather they are semantic, functional or informational equivalents. For example, a data object containing database table data in record columnar format can store the same data values for the rows and columns of the table as a data object containing the database table data in optimized row columnar format.

Continuing the summary of method 400, once the source data object is copied 402 to the target data object, one or more signatures (target signature(s)) for the target data object are obtained 404. The source data object is locked 406 to prevent modifications to the source data object. After the source data object is locked 406, one or more signatures (source signature(s)) for the source data object are obtained 408. While the lock on the source data object is still in place, the source signature(s) are compared 410 to the target signature(s) to determine 412 if they are any mismatches.

If there are no mismatches, then the lock on the source data object is released 414. On the other hand, if there are mismatches between the source signature(s) and the target signature(s), then, while the lock on the source data object is still in place, it may be determined 416 if the mismatches are substantial. If the mismatches are not substantial, then the mismatches are reconciled 418 such that that there are no longer the mismatches between the source data object and the target data object. After reconciling 418 the mismatches, the lock on the source data object is released 420. On the other hand, if the mismatches are substantial, then the lock on the source data object is released 422. Then, after releasing 422 the lock on the source data object, the mismatches between the source data object and the target data object are reconciled 424. The method 400 then returns to operation 406 to reconcile any additional mismatches arising after the lock was released 422.

Method 400 allows the DDOS to be live and accept and process requests to access the source data object including requests to modify the source data object while the source data object is copied 402. A lock on the source data object is held briefly to determine whether there is additional data that needs to be copied from the source data object to the target data object. If there is only a small amount of additional data to copy, then that small amount of data is copied before releasing the lock in the source data object. Otherwise, if there is a substantial amount of additional data to copy, then the lock is released to allow the DDOS to accept and process requests to access the source data object again.

Returning again to the top of method 400, at operation 402, the source data object in the source data format is copied without requiring a spanning lock. A spanning lock is a lock (e.g., a mutex) held on the data object for at least the entire length of the copying. The spanning lock may be a write lock, for example, that would prevent processes (including the DDOS itself) from modifying the source data object being copied during the entire time the source data object is copied 402. However, operation 402 is performed without using a spanning lock. As a result, the source data object may be modified during copying 402. Thus, the source data object remains "live" and available for access via DDOS while operation 402 is performed.

As indicated, in some situations, the source data object contains database table formatted in the record columnar format. To copy 402 the source data object containing the database table data from the record columnar format to the target data object containing the database table in optimized row columnar format, database table data is read from the source data object containing the database table data in record columnar format and the database table data read is written to the target data object that is configured to store database table data in optimized row columnar format. For example, a long-lived process can issue database manipulation language (DML) statements or the like against a database management system to select all rows from the source data object (source table) containing the database table data in record columnar format and issue database manipulation language (DML) to insert all rows selected into the target data object (target table) for containing the database table data in optimized row columnar format. By doing so, the database management system can be caused to create a copy of the source data object that stores the database table data in optimized row columnar format.

The copying 402 may be done in a streaming manner. For example, it is not necessary for the long-lived process to read all rows from the source data object (source table) before inserting any rows into the target data object (target table). Instead, as rows are read from the source data object (source table) they may be inserted into the target data object (target table). Thus, as a result of the streaming operation, at the worker node where the long-lived process executes, only a subset of all rows of the source table may be stored in storage media of the worker media at any given time.

While operation 402 is described above with respect to copying the source data object containing database table data in record columnar format to the target data object containing database table data in optimized row columnar format, operation 402 may be performed in a manner in which a copy of the source data object is created as the target data object where the source data object is in a source data format other than the record columnar format and the target data object is in a target data format other than the optimized row columnar format.

Since a spanning lock on the source data object is not used during copying 402, it is possible for the source data object to contain modifications (insert, updates and/or deletes) that were not copied 402 to the target data object. For example, a table row in the source data object could have been modified (updated) after the row was inserted into the target data object or new table row inserted that was not copied to the target data object. To determine whether additional data needs to be copied from the source data object to the target data object, CRC-based and/or checksum-based signatures can be used.

At operation 404, one or more signatures is/are obtained for the target data object. The signatures will be compared to signatures for the source data object to determine whether the source data object was modified before the source data object is locked 406.

A single signature or a tree of signatures can be obtained at operation 404. If a single signature, then the signature maybe a CRC-based and/or checksum-based value computed from at least the data of the target data object that can be modified in the source data object during the copying 402 and before the lock on the source data object is acquired 406. For example, the signature can be computed from the entire target data object, from the user data of the target data object or a portion thereof, from the format data of the target data object or a portion thereof, or from a selected combination of the format data or a portion thereof and the user data or a portion thereof.

A tree of signatures can be computed from the target data object. The tree of signatures can be used to make more fine-grained determinations about what has changed in the source data object. Where the source data object and the target data object contain database table data, a tree of signatures can be used to determine which rows of a database table were inserted, modified or deleted in the source data object. And for rows of the database table that were modified, the tree of signatures can be used to determine which values of the modified rows were modified.

Figure 5:
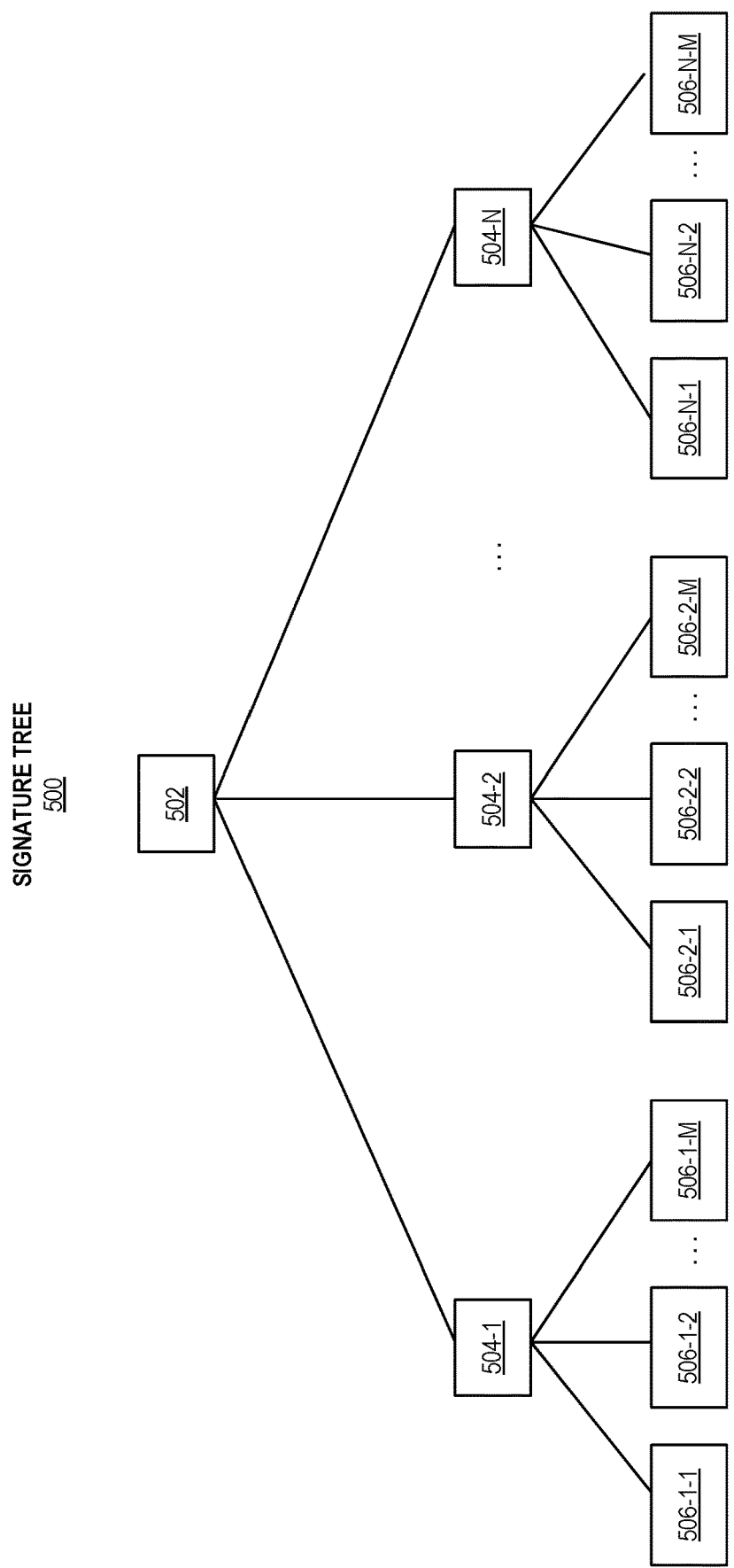
FIG. 5 depicts an example signature tree.

Computing a signature may be based on a CRC-based and/or checksum-based algorithm as such those discussed above or the like (CRC32, MD5, etc.). For example, a sequence of bytes or bits may be input to the algorithm executing on a processor which outputs a sequence of bytes or bits that is the signature for the input sequence. Typically, the output sequence is shorter than the input sequence such that the signature is a digest of the input sequence having the property FIG. 5 depicts example signature tree 500 for database table data. In this example, the table has N number of rows and M number of columns. For each row of the table, a CRC-based and/or checksum-based value is computed from each column value in the row. For example, signature 506-1-1 is computed from the value in the first column of the first row of the table, signature 506-1-2 is computed from the value in the second column of the first row of the table, and signature 506-1-M is computed from the value in the Mth column of the first row of the table. Likewise, signature 506-2-1 is computed from the value in the first column of the second row of the table, signature 506-2-2 is computed from the value in the second column of the second row of the table and signature 506-2-M is computed from the value in the Mth column of the second row of the table. And signature 506-N-1 is computed from the value in the first column of the Nth row of the table, signature 506-N-2 is computed from the value in the second column of the Nth row of the table, and signature 506-N-M is computed from the value in the Mth column of the Nth row of the table.

At the next level above in signature tree 500, a signature is computed for each row of the table as a CRC-based and/or checksum-based value from a concatenation of the signatures 506 computed for the column values of the row. For example, signature 504-1 is computed for the first row of the table based on column value signatures 506-1-1, 506-1-2, . . . and 506-1-M; signature 504-2 is computed for the second row of the table based on a concatenation of signatures 506-2-1, 506-2-2, . . . and 506-2-M; and signature 504-N is computed for the Nth row of the table based on a concatenation of signatures 506-N-1, 506-N-2, . . . and 506-2-M.

At the top level in signature tree 500, a single signature is computed for the target data object as a CRC-based and/or checksum-based value from a concatenation of the signatures 504 computed for the rows of the table. In particular, signature 502 is computed for the target data object based on a concatenation of signatures 504-1, 504-2, . . . and 504-N.

In some implementations, signature(s) for the target data object are obtained 404 during copying 402. For example, the signature(s) may be computed by the long-lived process performing method 400. For example, signature tree 500 may be computed for the database table data copied 402 from the source data object as the database table data is being copied 402 from the source data object to the target data object. For example, row-column value signatures (e.g., 506-2-1, 506-2-2, . . . and 506-2-M) for a row can be computed after the row is read (obtained) from the source data object. Once the row-column values signatures are computed for the row, the row signatures (e.g., 504-2) for the row can be computed. And once row signatures 504 for all rows of the source data object are computed, the signature 502 for the target data object can be computed.

In some embodiments, the signature(s) obtained 404 for the target data object are stored in signatures database 312 for later evaluation. For example, the computed signature(s) can be read back from signatures database 312 at operation 410 for comparison against signature(s) obtained 408 for the source data object after the source data object is locked 406. In addition, or alternatively, the signature(s) obtained 404 for the target data object can be stored at the worker node where the long-lived process performing method 400 is executing until used in operation 410.

In some implementations, as opposed to the long-lived process computing the signature(s) for the target data object, the DDOS computes signature(s) for the target data object during the copying 402 and stores the computed signature(s) the data object metadata 112 of the metadata node 108 of the DDOS. After copying 402 is complete, these signature(s) for the target data object can be obtained 404 from the metadata node 108 of the DDOS such as by reading the signature(s) from the metadata node 108 of the DDOS or by exporting a snapshot of the signature(s) to a data file.

At operation 406, a write lock on the source data object is obtained. The write lock allows the DDOS to read from the source data object but does not allow the DDOS to write to the source data object. Thus, the source data object remains live but only for read access and not for write access. Requests to write to the source data object may be queued or rejected by the DDOS until the write lock is released.

The write lock is obtained 406 on the source data object to determine if there are modifications to the source data object that were not copied 402 to the target data object before the write lock was acquired 406. For example, the modifications might include new database table rows, modified database table rows, and/or deleted database table rows that are not reflected in the target data object created 402.

At operation 408, one or more signatures for the source data object are obtained. The signature(s) can be obtained similarly to how signature(s) were obtained at operation 404 for the target data object. For example, after the write lock on the source data object is acquired 406, a single signature or a tree of signatures can be computed from the source data object. As another example, after the write lock on the source data is acquired 406, the signature(s) for the source data object can be read or otherwise obtained from the data object metadata 112 of the metadata node 108 of the DDOS.

In some cases, as indicated above, signature(s) for the source data object that are comparable to the signature(s) obtained 404 for the target data object are obtained (read) 408 from the data object metadata 112 of the metadata node 108 of the DDOS. Two signatures are comparable if the algorithms used for generating the signatures probabilistically generate identical signatures for identical input values and probabilistically generate different signatures for different input values. The signature(s) obtained 408 from the data object metadata 112 of DDOS may be a single signature or a tree of signatures (e.g., 500).

Since the write lock is acquired 406 on the source data object when the signature(s) for the source data object are obtained 408, the obtained 408 signature(s) should accurately reflect the current contents of the source data object.

At operation 410, the signature(s) obtained 404 for the target data object are compared to the signature(s) obtained 408 for the source data object. If just a single signature is obtained 404 for the target data object and just a single signature is obtained 408 for the source data object, then the signatures may be compared to determine if the target data object is an identical copy of the source data object. If a tree of signatures is obtained 404 for the target data object and a tree of signatures is obtained 408 for the source data object, then the trees can be compared signature by signature in a breadth first manner or depth first manner.

At operation 412, it is determined whether there are any mismatches between the signature(s) obtained 404 for the target data object and the signature(s) obtained 408 for the source data object. If there are no mismatches, then the target data object can replace the source data object in the DDOS. For example, the source data object (source database table) can be renamed to a backup name and the target data object (target database table) renamed to the source data object's (source database table) former name. The write lock on the source data object is released 414 and the method 400 ends.

On the other hand, if it is determined 412 that there are mismatches between the signature(s) obtained 404 for the target data object and the signature(s) obtained 408 for the source data object, then it is determined 416 if the number of mismatches is substantial. If the number of mismatches is not substantial, then the modifications to the source data object corresponding to the mismatches are copied 418 to the target data object without first releasing the write lock on the source data object. After the modifications are copied 418, then the write lock is released 420 and the method 400 ends.

However, if it determined 416 that the number of mismatches is substantial, then the write lock is released 422 before copying 424 the modifications to the source data object corresponding to the mismatches to the target data object. By releasing 422 the lock before copying 424, this allows the source data object to be available for read and write access while copying 424. The method 400 the returns to operation 404 to determine if there are additional mismatches that need to be reconciled.

If only a single signature is obtained 404 for the target data object and only a single signature is obtained 408 for the source data object, then there can only one mismatch and if those signatures do not match, then that one mismatch may be considered a substantial number of mismatches. However, if trees of signatures are used, then the number of mismatches may be counted.

For example, where the source data object and the target data object contain database table data, the number of mismatches of the row-level of the trees of signatures may be counted. In tree 500 of FIG. 5, signatures 504 are at the row-level. The number of mismatches at the row-level may include rows added to the source data object that were not copied 402 to the target data object, rows deleted from the source data object that were copied 402 to the target data object, and rows in the source data object that were copied 402 to the target data object but that were modified after being copied. Based on the number of these row-level mismatches, it can be determined 416 if the number of mismatches is substantial.

For example, if there are more than a threshold number of row-level mismatches, then it can be determined 416 that there is a substantial number of mismatches. No particular threshold number is required and the selection of the threshold number can be based on a variety of factors according to the requirements of the particular implementation at hand. For example, the threshold may be selected empirically based on the access workload of the DDOS and the amount of time needed to copy each mismatched row from the source data object to the target data object. For example, if the source data object experiences a heavy write workload, then minimizing the amount of time the write lock is held on the source data object may be more important to the implementation at hand than quickly converting the source data object.

If it is determined 416 that there is not a substantial number of row-level mismatches, then mismatched row(s) in the source data object is/are copied 418 to the target data object. In particular, new rows and modified rows in the source data object corresponding to mismatches determined 412 are copied 418 to the target data object. And any rows deleted in the source data object that were copied to the target data object are deleted from the target data object. In some cases, where there is a row-level mismatch, the mismatches for the row among the row-column signature sets 506 for the row are used to copy just the mismatching values in the row between the source data object and the target data object instead of copying the entire row.

If it is determined 416 there is a substantial number of mismatches, then the write lock on the source data object is released 422 and a modified method 400 is performed for a second iteration. When performing the second iteration of method 400, just the modifications to the source data object corresponding to the mismatches determined 412 during the first iteration of method 400 can be copied 424 to the target data object to avoid copying the entire source data object again.

Further, target signatures can be obtained 404 during the second iteration for just the mismatches (e.g., rows or values) copied 424 to the target data object, as opposed to obtaining 404 signatures for the entire target data object again. Signatures obtained 404 for non-mismatches of the target data object during the first iteration can be reused.

Further, if there are still mismatches at operation 412 of the second iteration, the pending mismatches may be copied 418 before releasing the lock 420 regardless if there are a substantial number of pending mismatches. In this way, at most two iterations of method 400 are performed for a source data object.

In some implementations, if there are any mismatches determined 412 during the first iteration of method 400, then the number of mismatches is considered substantial regardless of the number of mismatches. In these implementations, regardless of the number of mismatches determined 412 during the first iteration of method 400, the mismatches are reconciled 418 before releasing the lock 420. In this way, at most one iteration of method 400 is performed. In these implementations, there is no need to check whether there are a substantial number of mismatches at operation 416 and the method 400 can proceed directly from operation 412 to operation 418.

One skilled in the art would recognize from the description above that various modifications may be to method 400. For example, the target signature(s) may be obtained 404 after acquiring the lock 406. As another example, the target signature(s) may be obtained 404 from the DDOS if the DDOS computes the target signature(s) during copying 402.

Migration Method

Figure 6:
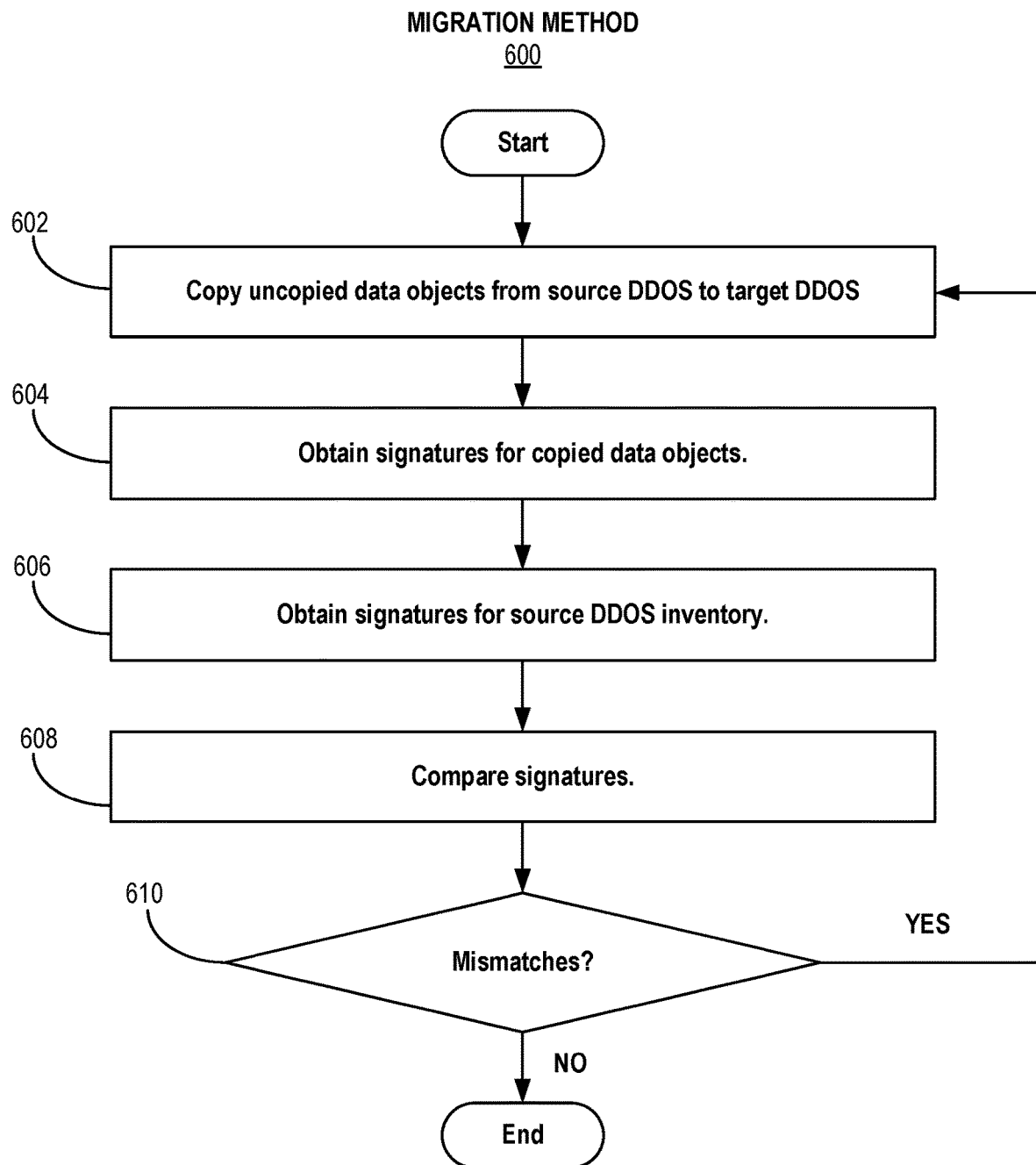
FIG. 6 is a flowchart of an example method for migrating data objects from a source distributed data object system to a target distributed data object system.

FIG. 6 depicts example migration method 600 described in the context of environment 300.

At operation 602, uncopied data objects in source DDOS 302 are copied from source DDOS 302 to target DDOS 304. To determine the uncopied data objects to copy, migration controller 308 obtains a snapshot of the inventory of source DDOS 302 satisfying the migration criterion. The snapshot may be obtained from data object metadata 112 of metadata node 108 of source DDOS 302. For example, the snapshot may include identifiers of the data objects stored in the source DDOS 302 that satisfy the migration criterion. The identifiers may be unique names or other unique identifiers of the data objects stored in the source DDOS 302 that satisfy the migration criterion. The snapshot may correspond to a distinct point in time or may correspond to a period of time such as the time needed to export or otherwise obtain data object metadata 112 from metadata node 108. However, there is no requirement that the snapshot be internally consistent. That is, within the snapshot, the signature of one data object may reflect the state of that data object as stored in the source DDOS 302 at a different point in time as the signature of another data object. Because of the eventual consistency approach described below, the source DDOS 302 may remain live and changes to data objects in source DDOS 302 may occur while the snapshot is being captured.

Upon obtaining the snapshot, the identifiers of the uncopied data objects are loaded into task queue 310. Next, long-lived worker processes executing at worker nodes 306 copy (e.g., stream) the data objects identified in the task queue 310 from the source DDOS 202 to the target DDOS 204. When a data object in task queue 310 is copied, the entry for the data object may be removed from the task queue 310, or otherwise marked as complete. The long-lived worker processes may continue to copy data objects from the source DDOS 302 to the target DDOS 304 so long as there are data objects to be copied according to task queue 310 or there are otherwise more uncopied data objects to copy according to task queue 310.

At operation 604, signatures for data objects copied 602 are obtained. In some embodiments, long-lived worker processes compute signatures for the data objects as they are being copied (e.g., streamed). For example, the long-lived worker processes may compute CRC values and/or checksum values from the data object are the data objects are streamed (copied) from source DDOS 302 to target DDOS 304. Instead of computing a signature of a data object as it is copied 602 from source DDOS 302 to target DDOS 304. The data object is first copied from source DDOS 302 to target DDOS 304, then the signature of the data object stored in the target DDOS 304 is computed by reading the data object back from the target DDOS 304 and computing the signature based on the data of the data object read back from the target DDOS 304. In either case, the computed signatures may then be stored in signatures database 312 in association with identifiers of the copied data objects.

The signatures computed at operation 604 may be computed in the same way that the source DDOS 302 computes signatures for data objects stored in the source DDOS 302. For example, the signatures of the copied data objects may be computed using the hash tree-like or Merkle tree-like approach discussed above or the composite CRC value approach discussed above. In this way, signatures computed for copied data objects at operation 604 are comparable to signatures computed for data objects by source DDOS 302 and stored as data object metadata 112 in metadata node 110 of source DDOS 302.

Signatures for data objects copied 602 by long-lived processes may be computed 604 by long-lived processes as the data objects are copied (e.g., streamed) from source DDOS 302 to target DDOS 304. The computed signatures are stored as part of data object metadata 112 of metadata node 108 of target DDOS 304. For example, the signatures may be stored as an attribute of copied data objects in data object metadata 112 of target DDOS 304. In this way, the metadata node 108 of target DDOS 304 may be used as a temporary storage of signatures computed 604 while copying 602 is being performed. After copying 602 is complete, the inventory of signatures computed 604 can be read back from data object metadata 112 of metadata node 108 of target DDOS 304 and then stored in signatures database 312 for the subsequent comparison 608 operation.

At operation 606, another snapshot of the inventory in source DDOS 302 is obtained. This inventory may be obtained after data objects are copied 602 and signatures computed 604 for the copied 602 data objects and stored in database 312. The second inventory may reflect changes to data objects satisfying the migration criterion that occurred while data objects were being copied 602. These changes can include new data objects, modified data objects, and deleted data objects. The new data objects and the modified data objects are data objects that were not copied 602 (i.e., are uncopied data objects). The second inventory may also include signatures generated by the source DDOS 302 for these new and modified data objects. In particular, the second inventory may include a signature generated by the source DDOS 302 for each data object in the source DDOS 302 satisfying the migration criterion where the signature is either for: (1) a data object that was already copied 602, (2) a data object that was created in the source DDOS 302 and not copied 602, or (3) a data object that was modified in the source DDOS 302 after that data object was copied 602. The signatures of the second inventory may also be stored in database 312 for comparison against the signatures computed 604 for the already copied 602 data objects and stored in database 312.

At operation 608, the set of signatures computed 604 is compared to the set of signatures obtained 606 from the second inventory snapshot. If the signatures for the same data object (as identified by name or unique identifier) are the same in both sets, then the data object did not change in the source DDOS 302 during the copying 602. If the signatures for the same data object are different between the sets of signatures, then there is a mismatch and the data object was modified in the source DDOS 302 during the copying 602 and the modified data object in the source DDOS 302 needs to be copied to the target DDOS 304. If there is a signature for a new data object in the signatures obtained 606 from the second inventory snapshot that is not identified in the set of signatures computed 604, then this a mismatch reflecting a new data object created in the source DDOS 302 that needs to be copied to the target DDOS 304. If there is a signature for a deleted data object in the signatures computed 604 that is not identified in the signatures obtained 606 from the second inventory snapshot, then this is a mismatch reflecting a data object already copied 602 to the target DDOS 304 that can be deleted from the target DDOS 304 because it was deleted from the source DDOS 302 during the copying 602.

At operation 610, if there are no mismatches between the sets of signatures compared 608, then the target DDOS 304 is consistent with the source DDOS 302 and the method 600 ends. However, if there are one or more mismatches, then the method 600 returns to operation 602 to copy the uncopied data objects in the source DDOS 302 satisfying the migration criterion (i.e., the new or modified data objects in source DDOS 302 determined at operation 608).

Operations 602-610 may be repeated as often as necessary until at operation 610 it is determined that the source DDOS 302 and the target DDOS 304 are consistent. Note that when repeating operation 602 it is not necessary to take a snapshot inventory of the source DDOS 302 to determine the uncopied data objects to be copied as the uncopied data objects are determined by the mismatches identified at the prior performance of operation 608. However, when repeating operation 606, the second inventory snapshot may be obtained like during the first performance of operation 606 in order to identify any newly added and modified data objects in the source DDOS 302.

Computing System Implementation

In some embodiments, a computing system includes one or more processors and storage media. The one or more processors and the storage media of the computing system may be provided by one or more computing devices. An example computing device 700 with processor(s) 704 and storage media (e.g., storage system 710, ROM 708, and/or main memory 706) is described below with respect to FIG. 7. The storage media stores instructions which, when executed by the computing system, cause the computing system to perform any of the above methods.

In some embodiments, one or more non-transitory media instructions which, when executed by the computing system, cause the computing system to perform any of the above methods.

In some embodiments, a computing device of the computing system hosts one or more hypervisors that operate on the computing device and emulate and/or virtualize computing hardware. A hypervisor can be a Type-1 (bare-metal hypervisor) or Type-2 hypervisor (hosted hypervisor), for example.

In some embodiments, a computing device of the computing system employs operating system-level virtualization in addition to, or in the absence of, one or more hypervisors. With operating system-level virtualization, the operating system kernel facilitates multiple isolated user space instances sometimes referred to as containers, zones, virtual private servers, partitions, virtual environments, virtual kernels, jails, etc.

In some embodiments, the computing system encompasses multiple computing devices in a distributed computing environment. Together, the multiple computing devices performs any of the above methods. In such an environment, computing devices may be continuously, periodically, or intermittently interconnected by one or more data communications networks (e.g., one or more Internet Protocol (IP) networks.)

Example Computing Device

Figure 7:
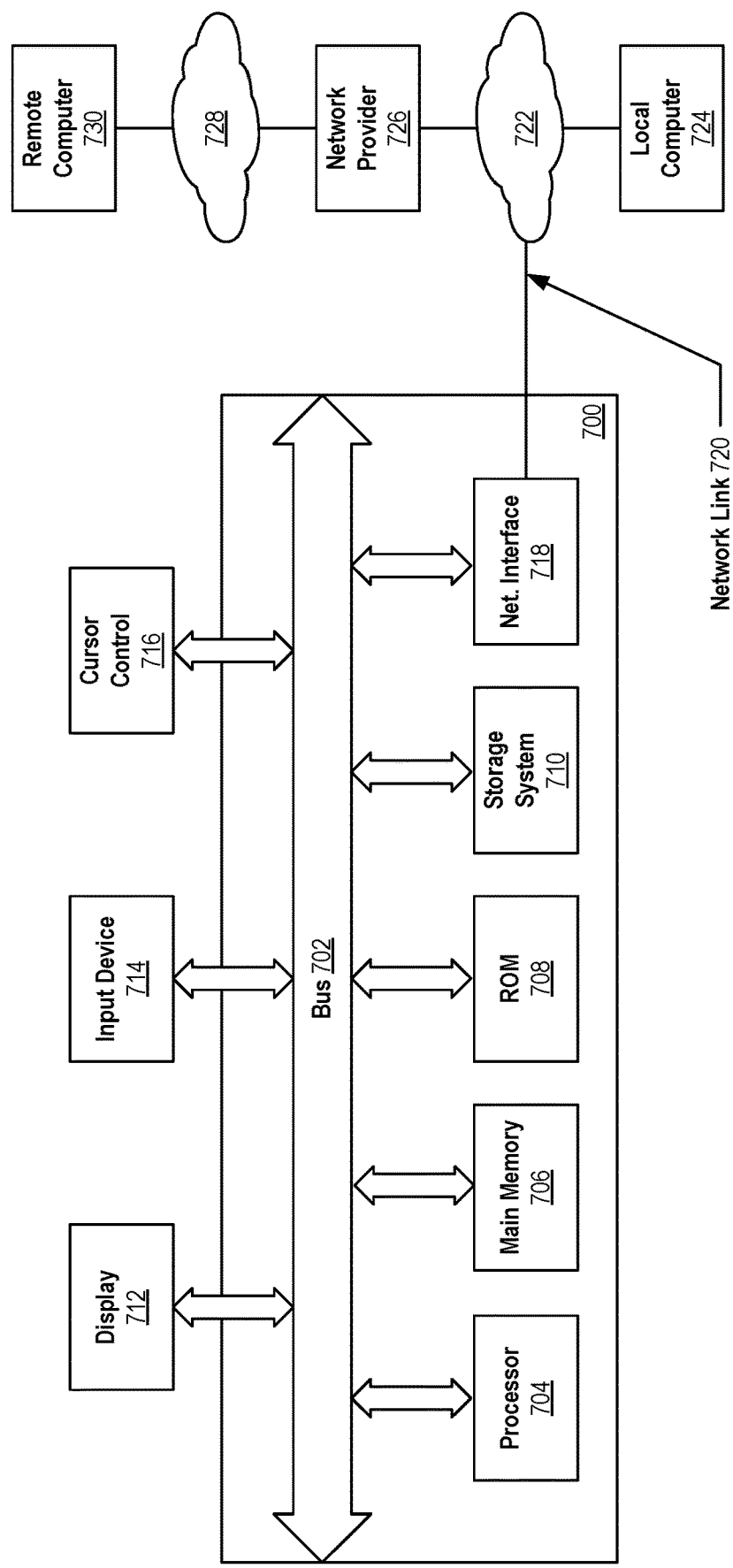
FIG. 7 illustrates an example computing device with which the conversion techniques and/or the migration techniques may be implemented.

FIG. 7 illustrates example computing device 700 according to some embodiments. Computing device 700 includes bus 702 or other communication mechanism for communicating information, and one or more hardware processors 704 coupled with bus 702 for processing information. Computing device 700 is just one example of a possible computing device that may be used in an implementation. Other computing device configurations having more, fewer, or different components may be used in an implementation.

Hardware processor(s) 704 include, for example, one or more general-purpose microprocessors, central processing units (CPUs) or cores thereof, graphics processing units (GPUs), or systems on a chip (SoCs).

Computing device 700 also includes main memory 706, implemented by one or more volatile memory devices, coupled to bus 702 for storing information and instructions to be executed by processor(s) 704. Main memory 706 also may be used for storing temporary variables or other intermediate information during execution of instructions by processor(s) 704.

Computing device 700 includes read-only memory (ROM) 708 or other static storage device coupled to bus 702 for storing static information and instructions for processor(s) 704.

Storage system 710 implemented by one or more non-volatile memory devices is provided and coupled to bus 702 for storing information and instructions.

Computing device 700 is coupled via bus 702 to display 712, such as a liquid crystal display (LCD), a light emitting diode (LED) display, or a cathode ray tube (CRT), for displaying information to a computer user. Display 712 may be combined with a touch sensitive surface to form a touch screen display. The touch sensitive surface may be an input device for communicating information including direction information and command selections to processor(s) 704 and for controlling cursor movement on display 712 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 714, including alphanumeric and other keys, is coupled to bus 702 for communicating information and command selections to processor(s) 704. Another type of user input device is cursor control 716, such as, for example, a mouse, a trackball, or cursor direction keys, for communicating direction information and command selections to processor(s) 704 and for controlling cursor movement on display 712. For example, his input device may have two degrees of freedom in two axes, a first axis (e.g., x) and a second axis (e.g., y), that allows the device to specify positions in a plane.

In some embodiments, computing device 700 in response to processor(s) 704 executing instructions contained in main memory 706 performs any of the above methods. Such instructions are read into main memory 706 from another storage medium, such as storage system 710. Execution of the instructions contained in main memory 706 may cause processor(s) 704 to perform any of the above methods. Hard-wired circuitry may be used in place of or in combination with instructions to perform any of the above methods.

The term "storage media" as used herein refers to any non-transitory media that store data and/or instructions that cause a machine to operate in a specific fashion. Such storage media may comprise non-volatile media (e.g., storage system 710) and/or volatile media (e.g., main memory 706). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 702. Transmission media can also take the form of acoustic or light waves, such as those generated during radio-wave and infra-red data communications.

Computing device 700 also includes data communications network interface 718 coupled to bus 702. Network interface 718 may provide a two-way data communication coupling to a wired or wireless network link 720 that is connected to a local, cellular or mobile network 722. For example, network interface 718 may be IEEE 802.3 wired "ethernet" card, an IEEE 802.11 wireless local area network (WLAN) card, an IEEE 802.15 wireless personal area network (e.g., Bluetooth) card or a cellular network (e.g., GSM, LTE, etc.) card to provide a data communication connection to a compatible wired or wireless network. Network interface 718 may send and receive electrical, electromagnetic or optical signals that carry digital data streams representing various types of information.

Network link 720 provides data communication through one or more networks to other data devices. For example, network link 720 may provide a persistent, periodic, or intermittent connection through network 722 to local computing device 724 that is also connected to network 722 or to data communication equipment operated by a network access provider 726 such as, for example, an internet service provider or a cellular network provider. Network access provider 726 in turn may provide data communication connectivity to another data communications network 728 (e.g., the Internet). Networks 722 and 728 both may use electrical, electromagnetic or optical signals that carry digital data streams. The signals through the various networks and the signals on network link 720 and through network interface 718, which carry the digital data to and from computing device 700, are example forms of transmission media. Computing device 700 may send messages and receives data, including program code, through the networks 722 and 728, network link 720 and network interface 718. In the Internet example, a remote computing device 730 may transmit a requested code for an application program through network 728, network 722 and network interface 718. The received code may be executed by processor 704 as it is received, and/or stored in storage device 710, or other non-volatile storage for later execution.

Conclusion

Reference herein to "some embodiments" means that a particular feature, structure, or characteristic is described in connection with and can be included in at least one embodiment of the invention. The appearances of the phrase "in some embodiments" in various places in the specification are not necessarily all referring to the same embodiment or embodiments, nor are separate or alternative embodiments mutually exclusive of other embodiments.

For situations in which the above systems and methods collect information about end-users, the end-users may be provided with an opportunity to opt in/out of programs or features that may collect personal information (e.g., information about a user's preferences or usage of a smart device). In addition, in some instances, certain data may be anonymized in one or more ways before it is stored or used, so that personally identifiable information is removed. For example, an end-user's identity may be anonymized so that the personally identifiable information cannot be determined for or associated with the end-user, and so that end-user preferences or end-user interactions are generalized (for example, generalized based on end-user demographics) rather than associated with a particular end-user.

Although some of various drawings illustrate a number of logical stages in a particular order, stages that are not order dependent may be reordered and other stages may be combined or broken out. While some reordering or other groupings are specifically mentioned, the ordering and groupings presented herein are not an exhaustive list of alternatives.

In the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

As used in the foregoing detailed description and in the appended claims, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description in the appended claims, the terms "based on," "according to," "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As used in the foregoing detailed description and in the appended claims, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing detailed description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

The invention claimed is:

1. A computing system comprising:
a plurality of processors;
storage media; and
instructions stored in the storage media which, when executed by the plurality of processors, cause the computing system to perform:
storing a first set of database tables in a target data format based on a second set of database tables in a source data format;
wherein the target data format is a different type than the source data format;
obtaining a first set of one or more signatures for a target database table of the first set of database tables in the target data format; and
for a source database table of the second set of database tables in the source data format:
acquiring a lock on the source database table,
obtaining a second set of one or more signatures for the source database table, comparing the first set of one or more signatures for the target database table to the second set of one or more signatures for the source database table, based on the comparing the first set of one or more signatures to the second set of one or more signatures, determining a set of one or more mismatched database table rows between the target database table and the source database table, determining whether a number of mismatched rows in the set of one or more mismatched database table rows does not exceed a threshold number of mismatched rows, copying the set of one or more mismatched database table rows from the source database table in the source data format to the target database table in the target data format, and in response to determining that the number of mismatched rows in the set of one or more mismatched database table rows does not exceed the threshold number of mismatched rows, releasing the lock on the source database table after performing the copying the set of one or more mismatched database table rows from the source database table in the source data format to the target database table in the target data format.

2. The computing system of claim 1, further comprising: instructions stored in the storage media which, when executed by the plurality of processors, cause the computing system to perform:

for the source database table in the second set of database tables:
in response to determining that the number of mismatched rows in the set of one or more mismatched database table rows exceeds the threshold number of mismatched rows, releasing the lock on the source database table before performing the copying the set of one or more mismatched database table rows from the source database table in the source data format to the target database table in the target data format.

3. The computing system of claim 1, further comprising: instructions stored in the storage media which, when executed by the plurality of processors, cause the computing system to perform:
obtaining the first set of one or more signatures from a metadata store.

4. The computing system of claim 1, further comprising: instructions stored in the storage media which, when executed by the plurality of processors, cause the computing system to perform:
computing the first set of one or more signatures from the target database table.

5. The computing system of claim 1, wherein the source data format is a record columnar format and the target data format is an optimized row columnar format.

6. A computer-implemented method comprising:
storing, by a computing system, a first set of data objects in a target data format based on a second set of data objects in a source data format by migrating the second set of data objects to the first set of data objects while also changing the second set of data objects from the source data format to the target data format and while writing to the second set of data objects is permitted, the target data format being a different type than the source data format;
obtaining, by the computing system, a first set of one or more signatures for a target data object of the first set of data objects in the target data format; and for a source data object of the second set of data objects in the source data format, the computing system:
acquiring a lock on the source data object,
obtaining a second set of one or more signatures for the source data object,
comparing the first set of one or more signatures for the target data object to the second set of one or more signatures for the source data object,
based on the comparing the first set of one or more signatures to the second set of one or more signatures, determining a set of one or more mismatches between the target data object and the source data object,
releasing the lock on the source data object, and
copying the set of one or more mismatches from the source data object in the source data format to the target data object in the target data format, wherein the releasing of the lock on the source data object occurs before performing the copying of the set of one or more mismatches from the source data object in the source data format to the target data object in the target data format in response to determining that a number of the mismatches exceeds a threshold.

7. The computer-implemented method of claim 6, further comprising:
for the source data object in the second set of data objects:
releasing the lock on the source data object before performing the copying the set of one or more mismatches from the source data object in the source data format to the target data object in the target data format.

8. The computer-implemented method of claim 6, wherein the first set of data objects and the second set of data objects each comprise at least one million data objects.

9. The computer-implemented method of claim 6, wherein the set of one or more mismatches between the source data object and the target data object is caused by one or more data objects in the second set of data objects being modified during the storing the first set of data objects in the target data format based on the second set of data objects in the source data format.

10. The computer-implemented method of claim 6, wherein the source data format is a record columnar format and the target data format is an optimized row columnar format.

11. The computer-implemented method of claim 6, wherein the lock acquired on the source data object is a write lock that allows the computing system to read the source data object.

12. The computer-implemented method of claim 6, wherein:
the set of one or more mismatches corresponds to a set of one or more database table rows of the source data object;
the copying the set of one or more mismatches from the source data object in the source data format to the target data object in the target data format comprises copying the set of one or more database table rows to the target data object; and
the set of one or more database tables rows copied to the target data object are stored in the target data object according to the target data format.

13. The computer-implemented method of claim 6, further comprising:

using a set of long-lived worker processes to perform the storing the first set of data objects in the target data format based on the second set of data objects in the source data format.

14. One or more non-transitory storage media storing instructions which, when executed by a computing system having one or more processors, cause the computing system to perform:
creating a first set of database tables in a target data format from a second set of database
tables in a source data format while continuing to allow writing to the second set of
database tables, the target data format being a different type than the source data format;
obtaining a first set of signatures for a target database table of the first set of database tables in the target data format; and
for a source database table of the second set of database tables in the source data format:
acquiring a lock on the source database table,
obtaining a second set of signatures for the source database table,
comparing the first set of signatures for the target database table to the second set of signatures for the source database table,
based on the comparing the first set of signatures to the second set of signatures, determining a set of mismatched database table rows between the target database table and the source database table,
releasing the lock on the source database table, and
copying the set of mismatched database table rows from the source database table in the source data format to the target database table in the target data format, wherein the releasing of the lock on the source database table occurs before performing the copying of the set of mismatched database table rows from the source database table in the source data format to the target database table in the target data format in response to determining that a number of the mismatched database table rows exceeds a threshold.

15. The one or more non-transitory storage media of claim 14, further comprising:
instructions which, when executed by the computing system having one or more processors, cause the computing system to perform:
for the source database table in the second set of database tables:
releasing the lock on the source database table before performing the copying the set of mismatched database table rows from the source database table in the source data format to the target database table in the target data format.

16. The one or more non-transitory storage media of claim 14, wherein the source data format is a record columnar format and the target data format is an optimized row columnar format.

* * * * *

UNITED STATES PATENT AND TRADEMARK OFFICE
CERTIFICATE OF CORRECTION

PATENT NO. : 11,379,498 B2
APPLICATION NO. : 16/878134
DATED : July 5, 2022
INVENTOR(S) : Ashish Gandhi et al.

It is certified that error appears in the above-identified patent and that said Letters Patent is hereby corrected as shown below:

In the Claims

Column 33, Claim 14, Lines 11-12, delete "tables in a source data format while continuing to allow writing to the second set of" and insert the same at Line 10 after "database" as a continuation point.

Column 33, Claim 14, Lines 13-14, delete "database tables, the target data format being a different type than the source data format;" and insert the same at Line 12 after "set of" as a continuation point.

Signed and Sealed this
Sixth Day of September, 2022

Katherine Kelly Vidal
*Director of the United States Patent and Trademark Office*